(12) United States Patent
Takamatsu et al.

(10) Patent No.: US 7,243,014 B2
(45) Date of Patent: Jul. 10, 2007

(54) VEHICLE INTEGRATED CONTROL SYSTEM

(75) Inventors: Hideki Takamatsu, Anjo (JP); Tsuneo Miyakoshi, Toyota (JP); Hirotada Otake, Susono (JP); Hiroshi Mizuno, Toyota (JP); Masami Kondo, Toyota (JP); Katsuyuki Kawai, Higashikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 10/999,933

(22) Filed: Dec. 1, 2004

(65) Prior Publication Data

US 2005/0137769 A1  Jun. 23, 2005

(30) Foreign Application Priority Data

Dec. 19, 2003 (JP) .............................. 2003-423509

(51) Int. Cl.
*G06F 17/00* (2006.01)
(52) U.S. Cl. ...................................................... 701/48
(58) Field of Classification Search ................ None
See application file for complete search history.

(56) References Cited

U.S. PATENT DOCUMENTS

| | | | | |
|---|---|---|---|---|
| 5,351,776 A | | 10/1994 | Keller et al. | |
| 5,699,250 A | * | 12/1997 | Kobayashi | 701/48 |
| 6,006,144 A | * | 12/1999 | Takahashi et al. | 701/1 |
| 6,188,945 B1 | * | 2/2001 | Graf et al. | 701/58 |
| 6,397,282 B1 | * | 5/2002 | Hashimoto et al. | 710/260 |
| 6,430,494 B1 | * | 8/2002 | Inoue et al. | 701/96 |
| 6,480,779 B2 | * | 11/2002 | Mardberg | 701/70 |
| 6,556,913 B2 | * | 4/2003 | Morizane et al. | 701/93 |
| 6,816,764 B2 | * | 11/2004 | Coelingh et al. | 701/37 |
| 7,047,117 B2 | * | 5/2006 | Akiyama et al. | 701/48 |

FOREIGN PATENT DOCUMENTS

| | | |
|---|---|---|
| JP | A-05-085228 | 4/1993 |
| JP | A-09-048263 | 2/1997 |
| JP | A-2003-191774 | 7/2003 |

OTHER PUBLICATIONS

U.S. Appl. No. 10/998,740, filed Nov. 30, 2004, Hideki Takamatsu et al.
U.S. Appl. No. 11/009,467, filed Dec. 13, 2004, Tsuneo Miyakoshi et al.

* cited by examiner

*Primary Examiner*—Michael J. Zanelli
(74) *Attorney, Agent, or Firm*—Oliff & Berridge, PLC

(57) ABSTRACT

An integrated control system includes a main control system (accelerator) controlling a driving system, a main control system (brake) controlling a brake system, a main control system (steering) controlling a steering system, an adviser unit generating and providing information to be used at each control system based on environmental information around the vehicle or information related to a driver, and an agent unit. The agent unit executes a program including a process of determining a control precondition, a step of calculating an instructed distance or a target distance to an instructed position, and a process of guarding (regulating) by environmental information.

16 Claims, 13 Drawing Sheets

F I G. 1
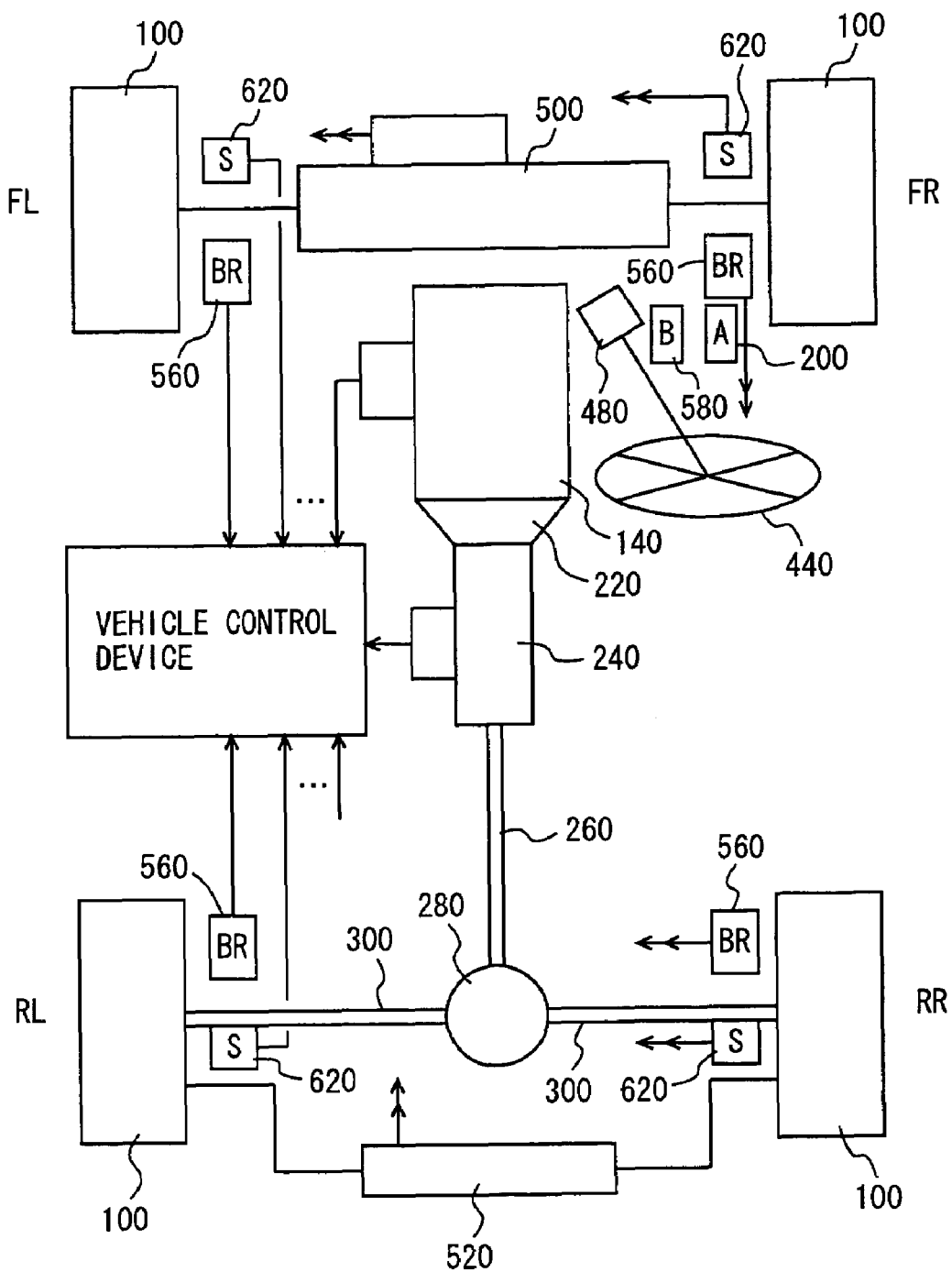

VEHICLE INTEGRATED CONTROL SYSTEM

This nonprovisional application is based on Japanese Patent Application No. 2003-423509 filed with the Japan Patent Office on Dec. 19, 2003, the entire contents of which are hereby incorporated by reference.

BACKGROUND OF THE INVENTION

1. Field of the Invention

The present invention relates to a system controlling a plurality of actuators incorporated in a vehicle, and more particularly, a system controlling in an integrated manner a plurality of actuators with the possibility of mutual interference.

2. Description of the Background Art

There has been an increasing trend in recent years towards incorporating many types of motion control devices in the same vehicle to control the motion of the vehicle. The effect produced by each of the different types of motion control devices may not always emerge in a manner independent of each other at the vehicle. There is a possibility of mutual interference. It is therefore important to sufficiently organize the interaction and coordination between respective motion control devices in developing a vehicle that incorporates a plurality of types of motion control devices.

For example, when it is required to incorporate a plurality of types of motion control devices in one vehicle in the development stage of a vehicle, it is possible to develop respective motion control devices independently of each other, and then implement the interaction and coordination between respective motion control devices in a supplemental or additional manner.

In the case of developing a plurality of types of motion control devices in the aforesaid manner, organization of the interaction and coordination between respective motion control devices requires much time and effort.

With regards to the scheme of incorporating a plurality of types of motion control devices in a vehicle, there is known the scheme of sharing the same actuator among the motion control devices. This scheme involves the problem of how the contention among the plurality of motion control devices, when required to operate the same actuator at the same time, is to be resolved.

In the above-described case where the interaction and coordination among a plurality of motion control devices are to be organized in a supplemental or additional manner after the motion control devices are developed independently of each other, it is difficult to solve the problem set forth above proficiently. In practice, the problem may be accommodated only by selecting an appropriate one of the plurality of motion control devices with precedence over the others, and dedicate the actuator to the selected motion control device alone.

An approach related to the problem set forth above in a vehicle incorporating a plurality of actuators to drive a vehicle in the desired behavior is disclosed in the following publications.

Japanese Patent Laying-Open No. 5-85228 (Document 1) discloses an electronic control system of a vehicle that can reduce the time required for development, and that can improve the reliability, usability, and maintenance feasibility of the vehicle. This electronic control system for a vehicle includes elements coacting for carrying out control tasks with reference to engine power, drive power and braking operation, and elements for coordinating the coaction of the elements to effect a control of operating performance of the motor vehicle in correspondence to a request of the driver. Respective elements are arranged in the form of a plurality of hierarchical levels. At least one of the coordinating elements of the hierarchical level is adapted for acting on the element of the next hierarchical level when translating the request of the driver into a corresponding operating performance of the motor vehicle thereby acting on a pre-given subordinate system of the driver-vehicle system while providing the performance required from the hierarchical level for this subordinate system.

By organizing the entire system in a hierarchy configuration in accordance with this electronic control system for a vehicle, an instruction can be conveyed only in the direction from an upper level to a lower level. The instruction to execute the driver's request is transmitted in this direction. Accordingly, a comprehensible structure of elements independent of each other is achieved. The linkage of individual systems can be reduced to a considerable level. The independency of respective elements allows the individual elements to be developed concurrently at the same time. Therefore, each element can be developed in accordance with a predetermined object. Only a few interfaces with respect to the higher hierarchical level and a small number of interfaces for the lower hierarchical level have to be taken into account. Accordingly, optimization of the totality of the driver and the vehicle electronic control system with respect to energy consumption, environmental compatibility, safety and comfort can be achieved. As a result, a vehicle electronic control system can be provided, allowing reduction in the development time, and improvement in reliability, usability, and maintenance feasibility of a vehicle.

Japanese Patent Laying-Open No. 2003-191774 (Document 2) discloses an integrated type vehicle motion control device adapting in a hierarchy manner a software configuration for a device that controls a plurality of actuators in an integrated manner to execute motion control of a plurality of different types in a vehicle, whereby the hierarchy structure is optimized from the standpoint of practical usage. This integrated vehicle motion control device controls a plurality of actuators in an integrated manner through a computer based on information related to driving a vehicle by a driver to execute a plurality of types of vehicle motion control for the vehicle. At least the software configuration among the hardware configuration and software configuration includes a plurality of elements organized in hierarchy in a direction from the driver towards the plurality of actuators. The plurality of elements include: (a) a control unit determining the target vehicle state quantity based on the driving-related information at the higher level; and (b) an execution unit receiving the determined target vehicle state quantity as an instruction from the control unit to execute the received instruction via at least one of the plurality of actuators at the lower level. The control unit includes an upper level control unit and a lower level control unit, each issuing an instruction to control the plurality of actuators in an integrated manner. The upper level control unit determines a first target vehicle state quantity based on the driving-related information without taking into account the dynamic behavior of the vehicle, and supplies the determined first target vehicle state quantity to the lower level control unit. The lower level control unit determines the second target vehicle state quantity based on the first target vehicle state quantity received from the upper level control unit, taking into account the dynamic behavior of the vehicle, and supplies the determined second target vehicle state quantity to the execution unit. Each of the upper level control unit, the lower level control unit, and the execution unit causes the computer to execute a plurality of modules independent of each other on the software configuration to realize unique functions thereof.

In accordance with this integrated type vehicle motion control device, at least the software configuration among the hardware configuration and software configuration is organized in a hierarchy structure so as to include: (a) a control unit determining a target vehicle state quantity based on driving-related information at the higher level in the direction from the driver to the plurality of actuators; and (b) an execution unit receiving the determined target vehicle state quantity as an instruction from the control unit to execute the received instruction via at least one of the plurality of actuators at the lower level. In other words, at least the software configuration is organized in hierarchal levels such that the control unit and the execution unit are separated from each other in this vehicle motion control device. Since the control unit and the execution unit are independent of each other from the software configuration perspective, respective stages of development, designing, design modification, debugging and the like can be effected without influencing the other. Respective stages can be carried out concurrently with each other. As a result, the period of the working stage required for the entire software configuration can be readily shortened by the integrated vehicle motion control device.

Further, an approach related to movement of a vehicle that is parking or the like by a small distance is disclosed in the following publication.

Japanese Patent Laying-Open No. 9-048263 (Document 3) discloses a driving force control device for a vehicle that enables automatic movement of a vehicle by a small distance, to reduce the burden of a driver and improve safety. The driving force control device for a vehicle is for moving a vehicle having a throttle actuator by a distance desired by a driver. The device includes input means for a driver to input a desired movement distance, throttle control means for causing a throttle opening to be input to the throttle actuator, actual travel distance detecting means for detecting an actual travel distance of the vehicle, and braking force generating means for stopping the vehicle when the detected signal of the actual travel distance detecting means reaches the target movement distance.

In this driving force control device for a vehicle, when the driver inputs a desired movement distance via the input means, the movement distance is reported to the throttle control means and to the braking force generating means. The throttle control means causes a throttle opening to be input to the throttle actuator. Here, the throttle control means gradually increases the throttle opening until the vehicle starts moving with reference to the detected value of the actual travel distance detecting means. When the vehicle starts moving, the actual travel distance detecting means reports the actual travel distance of the vehicle to the throttle control means and to the braking force generating means. When the actual travel distance of the vehicle reaches the movement distance input via the input means, the throttle control means inputs to the throttle actuator a command value designating complete closing of a throttle valve. At the same time, the braking force generating means generates the braking force to stop the vehicle. Thus, the driver can accurately move the vehicle by the small distance only by inputting the desired movement distance. Especially in a small parking garage or the like, even an unskilled driver can accurately move the vehicle.

However, the control devices disclosed in Documents 1 and 2 do not specifically disclose coordination control between driving and braking in vehicle movement control.

Further, the driving force control device for a vehicle disclosed in Document 3 is merely a device in which a computer controlling an engine that is a driving power source controls a degree of throttle opening. When the actual travel distance reaches the driver's desired distance, a computer controlling a brake generates a braking force to stop the vehicle. Accordingly, a driving system and a brake system are controlled separately, and the vehicle can hardly be stopped at the precise target position.

SUMMARY OF THE INVENTION

The present invention has been made to solve the problems described above, and an object thereof is to provide a vehicle integrated control system in which coordination control between driving and braking in vehicle movement control is performed, and that can eliminate the need for manipulations required for a driver to move a vehicle by a small distance.

A vehicle integrated control system according to the present invention includes: a plurality of control units including at least a driving system control unit and a brake system control unit, each having a function of controlling a running state of a vehicle based on a manipulation request; a processing unit generating information to be used at each control unit when causing the vehicle to move by a distance or to a position being set based on visual information of a driver and outputting the generated information to each control unit; and a sensing portion sensing an operation request with respect to at least one control unit. Each control unit includes a calculation unit calculating information related to a control target to manipulate an actuator set in correspondence with each unit using at least one of the information generated by the processing unit and the sensed operation request. Between the driving system control unit and the brake system control unit, a control target for attaining a target driving force of the vehicle is distributed to a driving force and a braking force.

According to the present invention, the plurality of control units include, for example, one of a driving system control unit, a brake system control unit, and a steering system control unit. The driving system control unit senses an accelerator pedal manipulation that is a request of a driver through the sensing portion to generate a control target of the driving system corresponding to the accelerator pedal manipulation using a driving basic driver model, whereby a power train that is an actuator is controlled by the controlling portion. The brake system control unit senses a brake pedal manipulation that is a request of the driver through the sensing portion to generate a control target of the brake system corresponding to the brake pedal manipulation using a brake basic driver model, whereby a brake device that is an actuator is controlled by the controlling portion. The steering system control unit senses a steering manipulation that is a request of the driver through the sensing portion to generate a control target of the steering system corresponding to the steering manipulation using a steering basic driver model, whereby a steering device that is an actuator is controlled by the controlling portion. The vehicle integrated control system includes a processing unit that operates parallel to the driving system control unit, brake system control unit and steering system control unit that operate autonomously. For example, the processing unit generates: 1) information to be used at respective controlling portions based on the environmental information around the vehicle or information related to the driver, and provides the generated information to respective control units; 2) information to be used at respective controlling portions to cause the vehicle to realize a predetermined behavior, and provides the generated information to respective control units; and 3) information to be used at respective controlling portions based on the current dynamic state of the vehicle, and provides the generated information to respective control units. Each control unit determines as to whether or not such input information, in addition to the driver's request from the processing unit, is to be reflected in the motion control of the vehicle, and to what extent, if to be reflected. Each control unit also corrects the control target, and transmits the information among respective control units. Since each control unit operates autonomously, the power train, brake device and steering device are controlled eventually at respective control units based on the eventual driving target, braking target and steering target calculated from the driver's manipulation information sensed by the sensing portion, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that the driving operation corresponding to the vehicle environment, driving support for the driver, and vehicle dynamic motion control can be conducted automatically in a parallel manner. As this processing unit, a unit is arranged that generates information to be used at each controlling portion when causing the vehicle to move by a movement distance or movement position identified by the eye sight of the driver and outputting the generated information to each control unit. For example, when causing a vehicle to enter a pallet of a multistory parking garage, the vehicle must be immediately stopped after passing over a stepped wheel stopper. Such movement of a vehicle by a small distance by manipulation of the accelerator and brake is difficult. Accordingly, the driver sets a movement distance or a moving position, and cause the control device to perform the operation for moving the vehicle. Specifically, each control unit receiving information including a target movement distance, a target movement position and/or a target movement speed calculates a target driving force and distributes a control target for attaining the target driving force to the driving system and the brake system, whereby the driving system control unit and the brake system control unit are controlled. Thus, a vehicle integrated control system in which a control device can automatically perform movement of a vehicle that is difficult with manipulation can be provided.

Preferably, the processing unit includes a movement distance setting portion setting a movement distance of the vehicle, a generating portion generating information to be used at each control unit when causing the vehicle to move by a distance being set by the driver, and an output portion outputting the generated information to each control unit.

According to the present invention, for example when causing a vehicle to move by a distance being set (within a range that can be identified by the eye sight of the driver), the vehicle movement distance is set by the movement distance setting portion, and further, a moving speed of the vehicle is additionally set. Each control unit execute control so that the vehicle is moved by the movement distance and the moving speed being set.

Further preferably, the movement distance setting portion stores in advance a movement distance per one manipulation of a manipulation device, and counts the number of manipulation of the manipulation device performed in a predetermined time period to set a movement distance of the vehicle.

According to the present invention, for example, a shift button of a transmission control device referred to as a sequential shift, which is for causing an automatic transmission to operate in a manner similarly to that of a manual transmission, is used as the manipulation device. The number of times of "+" or "−" of the button being pressed is sensed. Based on the number of manipulation of the manipulation device performed in a predetermined time period and the movement distance per one manipulation of the manipulation device, the vehicle movement distance desired by the driver can be set.

Further preferably, the processing unit further includes a storing portion storing information that has been set and that is related to the movement distance per one manipulation of a manipulation device or a movement speed, in correspondence with positional information on the vehicle relative to which said information is set, and a setting portion setting the information related to the movement distance per one manipulation of a manipulation device or a movement speed, based on the positional information on the vehicle and stored information, and using the stored information.

According to the present invention, if information, for example, related to a movement distance per one manipulation of a manipulation device or a movement speed is once set, information being set in correspondence with positional information on the vehicle at that time is stored. Thereafter, when the vehicle arrives at the same position, information on the movement distance per one manipulation of a manipulation device or a movement speed being stored is read, based on which the movement distance per one manipulation of a manipulation device or the movement speed is set. Accordingly, the need for the driver to input the same information repeatedly is eliminated.

Further preferably, the processing unit includes a movement target position setting portion setting a movement target position of the vehicle, a movement speed setting portion setting a movement speed of the vehicle, a generating portion generating information to be used at each control unit when causing the vehicle to move to a position set by the driver, and an output portion outputting the generated information to each control unit.

According to the invention, the vehicle can be controlled to be moved not by a movement distance, but for example to a position displayed on a monitor.

Further preferably, the movement target position setting portion sets a target movement position relative to image information imaging surroundings of the vehicle.

According to the present invention, for example, the driver touches the position to which he/she desires to move the vehicle on the image displayed on the monitor. The position is sensed by a touch panel, and the position is set as the target movement position. From the target movement position, the movement distance is calculated. Accordingly, setting of the movement distance is easy.

Further preferably, the processing unit acquires environmental information on surroundings of the vehicle, calculates a difficulty level for causing the vehicle to move by the distance set by the driver or to the position set by the driver, and determines whether or not control by each control unit should be executed.

According to the present invention, for example an obstacle in the surroundings of the vehicle is sensed as the environmental information on surroundings of the vehicle, and when movement to the set position is not possible due to that obstacle, a difficulty level indicating that the execution is difficult is calculated. In each control unit, whether or not control of movement to the target position should be executed can be determined based on the difficulty level.

Further preferably, the driving system actuator includes an engine and a motor, and the driving system control unit controls the driving system actuator so that an energy efficiency is improved when causing the vehicle to move by the distance set by the driver or to the position set by the driver, based on information from the processing unit.

According to the present invention, the engine and the motor that are the driving system actuators are controlled so that the energy efficiency is more improved. Accordingly, the energy efficiency in the vehicle is improved, which ultimately leads to improvement in fuel economy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of a vehicle in which the vehicle integrated control system of the present embodiment is incorporated.

DESCRIPTION OF THE PREFERRED EMBODIMENTS

Figure 2:
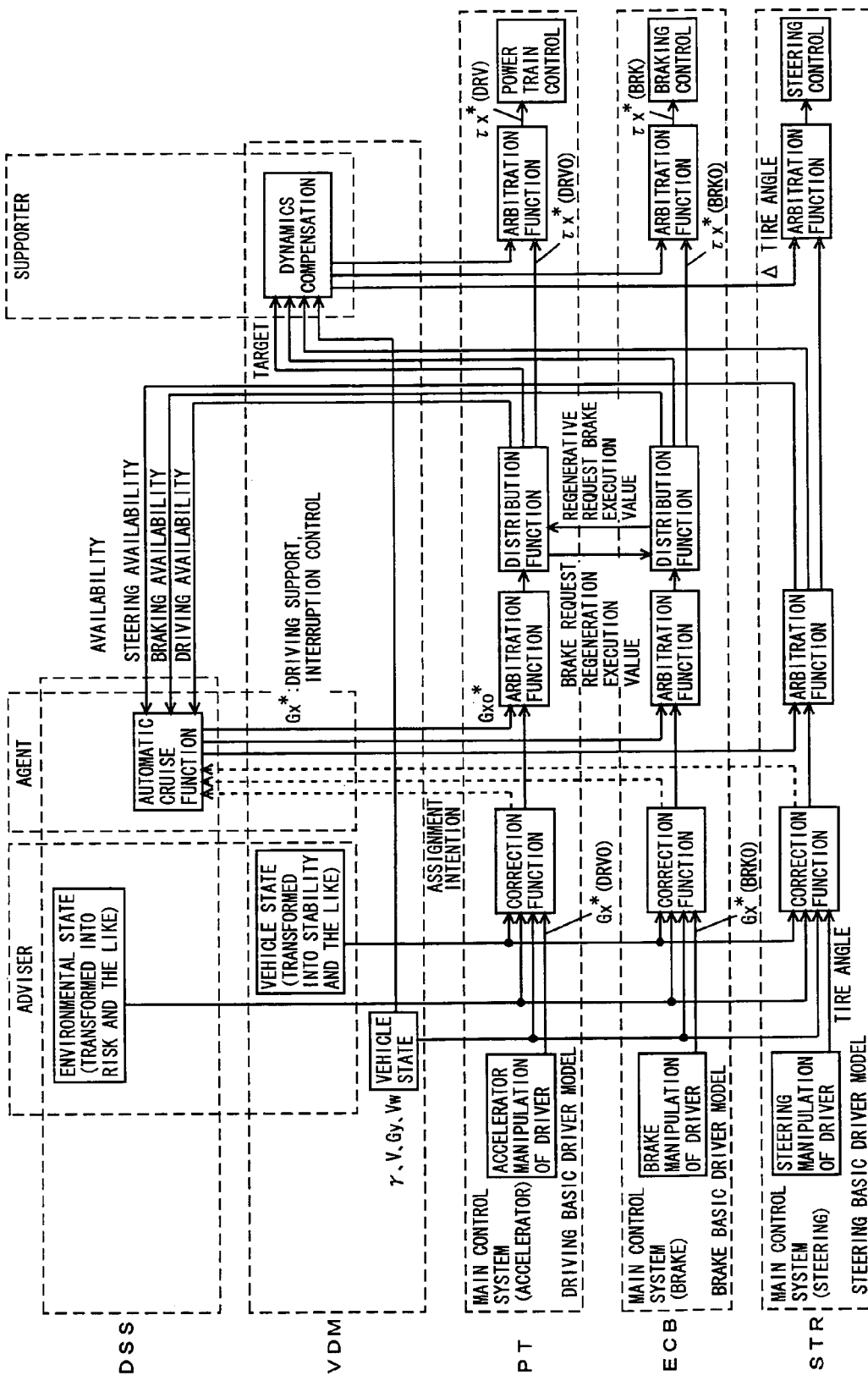
FIG. 2 is a schematic diagram of a configuration of the vehicle integrated control system according to the present embodiment.

An embodiment of the present invention will be described hereinafter with reference to the drawings. The same elements have the same reference characters allotted. Their label and function are also identical. Therefore, detailed description thereof will not be repeated.

Referring to the block diagram of FIG. 1, a vehicle integrated control system according to an embodiment of the present invention has an internal combustion engine incorporated in a vehicle as a driving power source. The driving power source is not restricted to an internal combustion engine, and may be an electric motor alone, or a combination of an engine and an electric motor. The power source of the electric motor may be a secondary battery or a cell.

The vehicle includes wheels 100 at the front and back of respective sides. In FIG. 1, "FL" denotes a front-left wheel, "FR" denotes a front-right wheel, "RL" denotes a left-rear wheel, and "RR" denotes a rear-right wheel.

The vehicle incorporates an engine 140 as a power source. The operating state of engine 140 is electrically controlled in accordance with the amount or level by which the accelerator pedal (which is one example of a member operated by the driver related to the vehicle drive) is manipulated by the driver. The operating state of engine 140 is controlled automatically, as necessary, irrespective of the manipulation of accelerator pedal 200 by the driver (hereinafter referred to as "driving operation" or "accelerating operation").

The electric control of engine 140 may be implemented by, for example, electrically controlling an opening angle (that is, a throttle opening) of a throttle valve disposed in an intake manifold of engine 140, or by electrically controlling the amount of fuel injected into the combustion chamber of engine 140.

The vehicle of the present embodiment is a rear-wheel-drive vehicle in which the right and left front wheels are driven wheels, and the right and left rear wheels are driving wheels. Engine 140 is connected to each of the rear wheels via a torque converter 220, a transmission 240, a propeller shaft 260 and a differential gear unit 280 as well as a drive shaft 300 that rotates with each rear wheel, all arranged in the order of description. Torque converter 220, transmission 240, propeller shaft 260 and differential gear 280 are power transmitting elements that are common to the right and left rear wheels.

Transmission 240 includes an automatic transmission that is not shown. This automatic transmission electrically controls the gear ratio at which the revolution speed of engine 140 is changed to the speed of rotation of an output shaft of transmission 240.

The vehicle further includes a steering wheel 440 adapted to be turned by the driver. A steering reaction force applying device 480 electrically applies a steering reaction force corresponding to a turning manipulation by the driver (hereinafter, referred to as "steering") to steering wheel 440. The level of the steering reaction force is electrically controllable.

The direction of the right and left front wheels, i.e. the front-wheel steering angle is electrically altered by a front steering device 500. Front steering device 500 controls the front-wheel steering angle based on the angle, or steering wheel angle, by which steering wheel 440 is turned by the driver. The front-rear steering angle is controlled automatically, as necessary, irrespective of the turning operation. In other words, steering wheel 440 is mechanically insulated from the right and left front wheels.

The direction of the left and right wheels, i.e., the rear-wheel steering angle is electrically altered by a rear steering device 520, likewise the front-wheel steering angle.

Each wheel 100 is provided with a brake 560 that is actuated so as to restrict its rotation. Each brake 560 is electrically controlled in accordance with the operated amount of a brake pedal 580 (which is one example of a member operated by the driver related to vehicle braking), and also controlled individually for each wheel 100 automatically.

In the present vehicle, each wheel 100 is suspended to the vehicle body (not shown) via each suspension 620. The suspending characteristics of respective suspension 620 is electrically controllable individually.

The constituent elements of the vehicle set forth above include an actuator adapted to be operated so as to electrically actuate respective elements as follows:

(1) An actuator to electrically control engine 140;

(2) An actuator to electrically control transmission 240;

(3) An actuator to electrically control steering reaction force applying device 480;

(4) An actuator to electrically control front steering device 500;

(5) An actuator to electrically control rear steering device 520;

(6) A plurality of actuators provided in association with respective brakes 560 to electrically control the braking torque applied to each wheel by a corresponding brake 560 individually;

(7) A plurality of actuators provided in association with respective suspensions 620 to electrically control the suspending characteristics of a corresponding suspension 620 individually.

As shown in FIG. 1, the vehicle integrated control system is incorporated in a vehicle having the aforesaid plurality of actuators connected. The motion control device is actuated by the electric power supplied from a battery not shown (which is an example of the vehicle power supply).

Additionally, an accelerator pedal reaction force applying device may be provided for accelerator pedal 200. In this case, an actuator to electrically control such an accelerator pedal reaction force applying device is to be provided.

FIG. 2 is a schematic diagram of a configuration of the vehicle integrated control system. The vehicle integrated control system is formed of three basic control units, i.e. a main control system (1) as the driving system control unit, a main control system (2) as the brake system control unit, and a main control system (3) as the steering system control unit.

At main control system (1) identified as the driving system control unit, a control target of the driving system corresponding to accelerator pedal manipulation is generated using the driving basic driver model, based on the accelerator pedal manipulation that is the sensed request of the driver, whereby the actuator is controlled. At main control system (1), the input signal from the sensor to sense the accelerator pedal operated level of the driver (stroke) is analyzed using the drive basic model to calculate a target longitudinal acceleration Gx* (DRV0). The target longitudinal acceleration Gx* (DRV0) is corrected by a correction functional block based on the information from an adviser unit. Further, target longitudinal acceleration Gx* (DRV0) is arbitrated by the arbitration functional block based on the information from an agent unit. Further, the driving torque and braking torque is distributed with main control system (2), and the target driving torque τx* (DRV0) of the driving side is calculated. Further, the target driving torque τx* (DRV0) is arbitrated by the arbitration functional block based on information from a supporter unit, and a target driving torque τx* (DRV) is calculated. The power train (140, 220, 240) is controlled so as to develop this target driving torque τx* (DRV).

At main control system (2) identified as the brake system control unit, a control target of the brake system corresponding to the brake pedal manipulation is generated using the brake basic driver model based on the brake pedal manipulation that is the sensed request of the driver, whereby the actuator is controlled.

At main control system (2), the input signal from a sensor to sense the brake pedal manipulated level (depression) of the driver is analyzed using a brake basic model to calculate a target longitudinal acceleration Gx* (BRK0). At main control system (2), the target longitudinal acceleration Gx* (BRK0) is corrected by a correction functional block based on the information from the adviser unit. Further at main control system (2), the target longitudinal acceleration Gx* (BRK0) is arbitrated by the arbitration functional block based on the information from the agent unit. Further at main control system (2), the driving torque and the braking torque are distributed with main control system (1), and the target braking torque τx* (BRK0) of the braking side is calculated. Further, the target braking torque τx* (BRK0) is arbitrated by the arbitration functional block based on the information from the support unit, and target braking torque τx* (BRK) is calculated. The actuator of brake 560 is controlled so as to develop this target braking torque τx* (BRK).

At main control system (3) identified as the steering system control unit, a control target of the steering system corresponding to the steering manipulation is generated using the steering brake basic driver model based on the steering manipulation that is the sensed request of the driver, whereby the actuator is controlled.

At main control system (3), an input signal from the sensor to sense the steering angle of the driver is analyzed using a steering basic model to calculate a target tire angle. The target tire angle is corrected by the correction functional block based on the information from the adviser unit. Further, the target tire angle is arbitrated by the arbitration functional block based on the information from the agent unit. Further, the target tire angle is arbitrated by the arbitration functional block based on the information from the supporter unit to calculate the target tire angle. The actuators of front steering device 500 and rear steering device 520 are controlled so as to develop the target tire angle.

Furthermore, the present vehicle integrated control system includes a plurality of processing units parallel to main control system (1) (driving system control unit), main control system (2) (brake system unit) and main control system (3) (steering system control unit), operating autonomously. The first processing unit is an adviser unit with an adviser function. The second processing unit is an agent unit with an agent function. The third processing unit is a support unit with a supporter function.

The adviser unit generates and provides to respective main control systems information to be used at respective main control systems based on the environmental information around the vehicle or information related to the driver. The agent unit generates and provides to respective main control systems information to be used at respective main control systems to cause the vehicle to realize a predetermined behavior. The supporter unit generates and provides to respective main control systems information to be used at respective main control systems based on the current dynamic state of the vehicle. At respective main control systems, determination is made as to whether or not such information input from the adviser unit, the agent unit and the supporter unit (information other than the request of the driver) is to be reflected in the motion control of the vehicle, and to what extent, if to be reflected. Furthermore, the control target is corrected, and/or information is transmitted among respective control units. Since each main control system operates autonomously, the actuator of the power train, the actuator of brake device and the actuator of steering device are controlled eventually at respective control units based on the eventual driving target, braking target and steering target calculated by the sensed manipulation information on the driver, information input from the adviser unit, agent unit and supporter unit, and information transmitted among respective main control systems.

Specifically, the adviser unit generates information representing the degree of risk with respect to the vehicle operation property based on the frictional resistance (μ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to each main control system. This information representing the degree of risk is processed at the adviser unit so the information can be used at any of the main control systems. At each main control system, the process is carried out as to whether or not to reflect the information related to the input risk for the vehicle motion control, in addition to the request of the driver from the processing unit, and to what extent the information is to be reflected, and the like.

Specifically, the agent unit generates information to implement an automatic cruise function for the automatic drive of vehicle. The information to implement the automatic cruise function is output to each main control system. At each main control system, the process is carried out as to whether or not to reflect the input information to implement the automatic cruise function, in addition to the request of the driver from the processing unit, and to what extent the information is to be reflected, and the like.

Further preferably, the supporter unit identifies the current dynamic state of the vehicle, and generates information to modify the target value at each main control system. The information to modify the target value is output to each main control system. At each main control system, the process is carried out as to whether or not to reflect the input information to modify the target value based on the dynamic state for the vehicle motion control, in addition to the request of the driver from the processing unit, and to what extent the information is to be reflected, and the like.

As shown in FIG. 2, the basic control units of main control system (1), main control system (2) and main control system (3), and the support unit of the adviser unit, agent unit, and supporter unit are all configured so as to operate autonomously. Main control system (1) is designated as the PT (Power Train) system. Main control system (2) is designated as the ECB (Electronic Controlled Brake) system. Main control system (3) is designated as the STR (Steering) system. A portion of the adviser unit and the portion of the agent unit are designated as the DSS (Driving Support System). A portion of the adviser unit, a portion of the agent unit, and a portion of the supporter unit are designated as the VDM (Vehicle Dynamics Management) system. Interruption control for intervention of control executed at main control system (1), main control system (2) and main control system (3) from the agent unit (automatic cruise function) is conducted in the control shown in FIG. 2.

Main control system (1) (driving system control unit) will be described in further detail with reference to FIG. 3. Although the designation of the variable labels may differ in FIG. 3 and et seq., there is, no essential difference thereby in the present invention. For example, the interface is designated as Gx* (acceleration) in FIG. 2 whereas the interface is designated as Fx (driving force) in FIG. 3 and et seq. This corresponds to F (force)=m (mass)×α (acceleration), where the vehicle mass (m) is not the subject of control, and is not envisaged of being variable. Therefore, there is no essential difference between Gx* (acceleration) of FIG. 2 and Fx (driving force) of FIG. 3 and et seq.

Main control system (1) that is the unit to control the driving system receives information such as the vehicle velocity, gear ratio of the transmission and the like identified as shared information (9). Using such information and the driving basic driver model, Fxp0 representing the target longitudinal direction acceleration is calculated as the output of the driving basic driver model. The calculated Fxp0 is corrected to Fxp1 by a correction functional unit (2) using environmental state (6) that is the risk degree information (index) as an abstraction of risk and the like, input from the adviser unit. Information representing the intention of assignment with respect to realizing an automatic cruise function is output from correction functional unit (2) to agent unit (7). Using Fxp1 corrected by correction functional unit (2) and information for implementation of automatic cruise functional unit (7), input from the agent unit, the information (Fxp1, Fxa) is arbitrated by arbitration functional unit (3) to Fxp2.

The dividing ratio of the driving torque and braking torque is calculated between main control system (1) that is the unit controlling the driving system and main control system (2) that is the unit driving the brake system. At main control system (1) corresponding to the driving unit side, Fxp3 of the driving system is calculated. FxB is output from distribution functional unit (4) to main control system (2), and the driving availability and target value are output to agent unit (7) and dynamic (8) that is the supporter unit, respectively.

At arbitration functional unit (5), the information is arbitrated to Fxp4 using Fxp3 output from distribution functional unit (4) and Fxp_vdm from dynamics compensation functional unit (8). Based on the arbitrated Fxp4, the power train is controlled.

Figure 3:
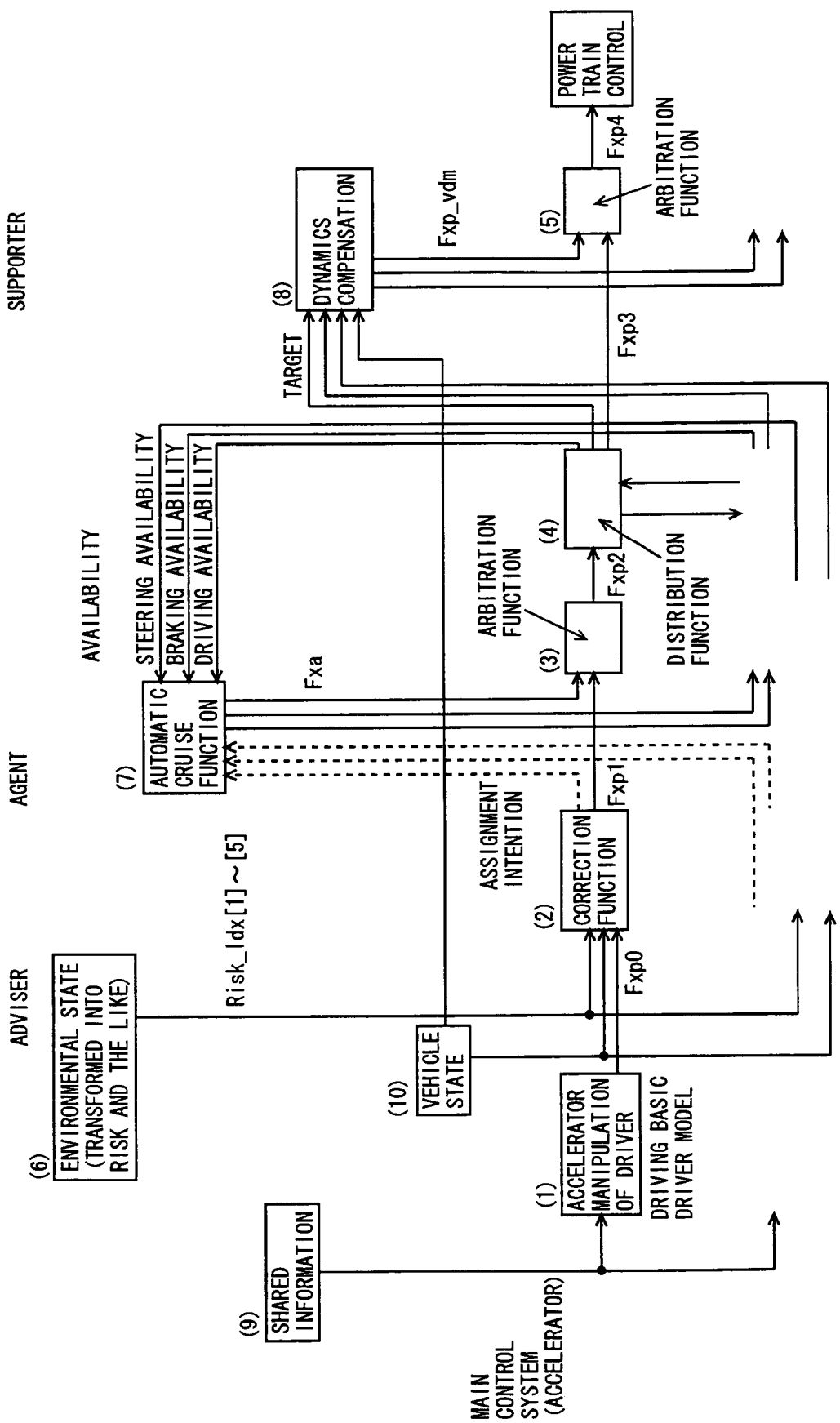
FIG. 3 is a schematic diagram of a configuration of a main control system (1).

The elements shown in FIG. 3 are also present in main control system (2) and main control system (3). Since main control system (2) and main control system (3) will be described in further detail with reference to FIGS. 5–6, description on main control system (2) and main control system (3) based on drawings corresponding to main control system (1) of FIG. 3 will not be repeated.

Figure 4:
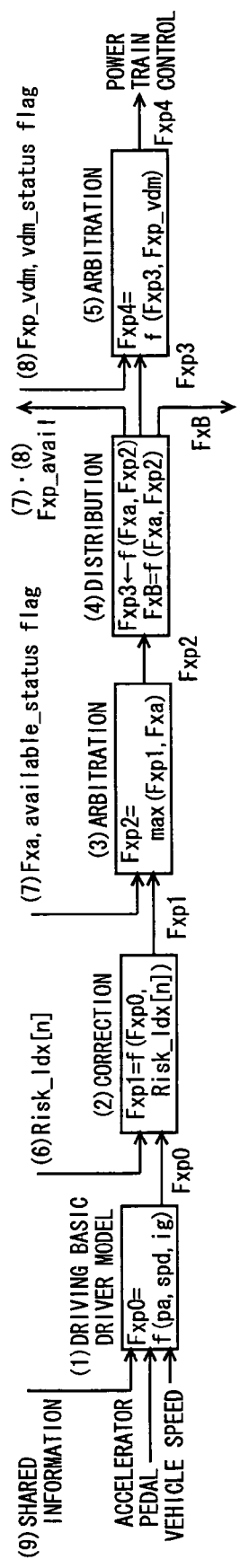
FIG. 4 is a diagram representing the input and output of signals in a main control system (1).
Figure 5:
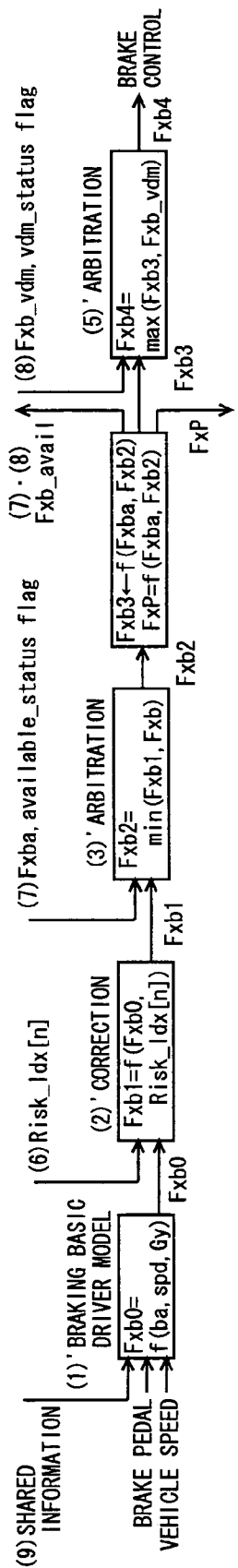
FIG. 5 is a diagram representing the input and output of signals in a main control system (2).
Figure 6:
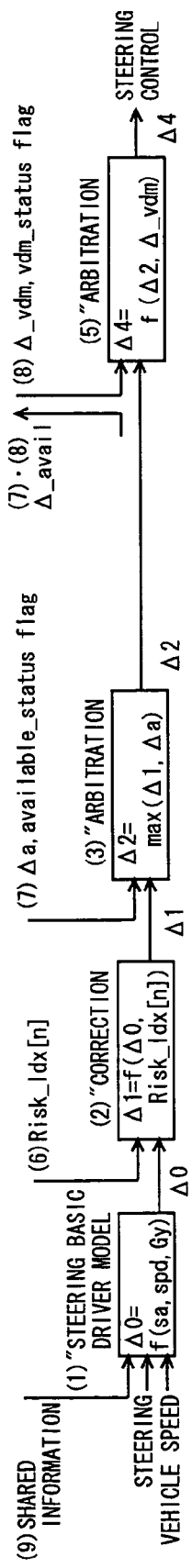
FIG. 6 is a diagram representing the input and output of signals in a main control system (3).

FIGS. 4–6 represent the control configuration of main control system (1), main control system (2) and main control system (3).

FIG. 4 shows a control configuration of main control system (1). Main control system (1) that covers control of the driving system is adapted by the procedures set forth below.

At driving basic driver model (1), the basic drive driver model output (Fxp0) is calculated based on HMI (Human Machine Interface) input information such as the accelerator pedal opening angle (pa), vehicle speed (spd) and gear ratio (ig) of the transmission that are shared information (9), and the like. The equation at this stage is represented by Fxp0=f (pa, spd, ig), using function f.

At correction functional unit (2), Fxp0 is corrected to output Fxp1 based on Risk_Idx [n] that is the environmental information (6) from the advisor unit (for example, information transformed into the concept of risk or the like). The equation at this stage is represented by Fxp1=f (Fxp0, Risk_Idx [n]), using function f.

Specifically, it is calculated by, for example, Fxp11=Fxp0×Risk_Idx [n]. The degree of risk is input from the advisor unit such as Risk_Idx [1]=0.8, Risk_Idx [2]=0.6, and Risk_Idx [3]=0.5.

Additionally, Fxp12 is calculated, which is a corrected version of Fxp0, based on information that is transformed into the concept of stability and the like from the vehicle state (10). The equation at this stage is represented by, for example, Fxp12=Fxp0×Stable_Idx [n]. The stability is input such as Stable_Idx [1]=0.8, Stable_Idx [2]=0.6, and Stable_Idx [3]=0.5.

A smaller value of these Fxp11 and Fxp 12 may be selected to be output as Fxp1.

In this correction functional unit (2), assignment intention information can be output to automatic cruise functional unit (7) that is an agent function when the driver depresses the cruise control switch. In the case where the accelerator pedal is a reaction force controllable type here, the automatic cruise intention of the driver is identified based on the driver's manipulation with respect to the accelerator pedal to output assignment intention information to automatic cruise functional unit (7).

At arbitration functional unit (3), arbitration between Fxp1 output from correction functional unit (2) and Fxa output from automatic cruise functional unit (7) of the agent unit is executed to output Fxp2 to distribution unit (4). When accompanied with additional information (flag, available_status flag) indicative of output Fxa from automatic cruise functional unit (7) being valid, the arbitration function selects Fxa that is the output from automatic cruise functional unit (7) with highest priority to calculate Fxp2. In other cases, Fxp1 that is the output from correction functional unit (2) may be selected to calculate Fxp2, or Fxp1 output from correction function unit (2) may have Fxa reflected at a predetermined degree of reflection to calculate Fxp2. The equation at this stage is represented by Fxp2=max (Fxp1, Fxa), for example, using a function "max" that selects the larger value.

At distribution functional unit (4), distribution operation is mainly effected between main control system (1) that is the driving system control unit and main control system (2) that is the brake system control unit. Distribution functional unit (4) functions to output Fxp3 to arbitration functional unit (5) for the distribution towards the driving system that is the calculated result, and outputs FxB to main control system (2) for the distribution towards the brake system that is the calculated result. Further, drive availability Fxp_avail identified as the information of the driving power source that can be output from the power train which is the subject of control of main control system (1) is provided to automatic cruise functional unit (7) identified as the agent unit and dynamics compensation functional unit (8) identified as the supporter unit. The equation at this stage is represented by Fxp3←f (Fxa, Fxp2), FxB=f (Fxa, Fxp2), using function f.

At arbitration functional unit (5), arbitration is executed between Fxp3 output from distribution functional unit (4) and Fxp_vdm output from dynamics compensation functional unit (8) to output Fxp4 to the power train controller. When accompanied with additional information (flag, vdm_status flag) indicative of Fxp_vdm output from dynamics compensation functional unit (8) being valid, the arbitration function selects Fxp_vdm that is the output from dynamics compensation functional unit (8) with highest priority to calculate Fxp4. In other cases, Fxp3 that is the output from distribution functional unit (4) can be selected to calculate Fxp4, or Fxp3 output from distribution functional unit (4) may have Fxp_vdm reflected by a predetermined degree of reflection to calculate Fxp4. The equation at this stage is represented by, for example, Fxp4=f (Fxp3, Fxp_vdm).

FIG. 5 represents the control configuration of main control system (2). Main control system (2) covering the control of the brake system is adapted by the procedure set forth below.

At the brake basic driver model (1)', the basic braking driver model output (Fxp0) is calculated based on the HMI input information such as the brake pedal depression (ba), as well as vehicle speed (spd), that is the shared information (9), the horizontal G acting on the vehicle (Gy), and the like. The equation at this stage is represented by Fxb0=f (pa, spd, Gy), using function f.

At correction function unit (2)', Fxb0 is corrected to output Fxb1 based on Risk_Idx [n] that is the environmental information (6) from the advisor unit (for example, information transformed into the concept of risk and the like). The equation at this stage is represented by Fxb1=f (Fxb0, Risk_Idx [n]), using function f.

More specifically, it is calculated by, for example, Fxb11=Fxb0×Risk_Idx [n]. The degree of risk is input from the advisor unit such as Risk_Idx [1]=0.8, Risk_Idx [2]=0.6, and Risk_Idx [3]=0.5.

Further, Fxb12 that is a corrected version of Fxb0 is calculated, based on information transformed into the concept of stability and the like from the vehicle state (10). It is calculated by, for example, Fxb12=Fxb0×Stable_Idx [n]. For example, Stable_Idx [1]=0.8, Stable_Idx [2]=0.6, and Stable_Idx [3]=0.5 are input.

The larger of these Fxb11 and Fxb12 may be selected to be output as Fxb1. Specifically, the output may be corrected in accordance with the distance from the preceding running vehicle sensed by a millimeter wave radar, the distance to the next corner sensed by the navigation device, or the like.

At arbitration functional unit (3)', arbitration is executed between Fxb1 output from correction functional unit (2)' and Fxba output from automatic cruise functional unit (7) that is the agent unit to output Fxb2 to distribution unit (4)'. When accompanied with additional information (flag, available_status flag) indicative of Fxba output from automatic cruise functional unit (7) being valid, the arbitration function selects Fxba that is the output from automatic cruise functional unit (7) with highest priority to calculate Fxb2. In other cases, Fxb1 that is the output from correction functional unit (2)' may be selected to calculate Fxb2, or Fxb1 that is the output from correction functional unit (2)' may have Fxba reflected by a predetermined degree of reflection to calculate Fxb2. The equation at this stage is represented by, for example, Fxb2=max (Fxb1, Fxba), using a function "max" that selects the larger value.

At distribution functional unit (4)', distribution operation is conducted between main control system (1) that is the driving system control unit and main control system (2) that is the brake system control unit. Functional distribution unit (4)' corresponds to distribution functional unit (4) of main control system (1). Distribution functional unit (4)' outputs Fxb3 to arbitration functional unit (5)' for distribution towards the brake system that is the calculated result, and outputs FxP to main control system (1) for distribution towards the driving system that is the calculated result. Further, brake availability Fxb_avail identified as information that can be output from the brake that is the subject of control of main control system (2) is provided to automatic cruise functional unit (7) identified as the agent unit and dynamics compensation functional unit (8) identified as the supporter unit. The equation at this stage is represented by Fxb3←f (Fxba, Fxb2), FxP=f (Fxba, Fxb2), using function f.

Arbitration functional unit (5)' executes arbitration between Fxb3 output from distribution functional unit (4)' and Fxb_vdm output from dynamics compensation functional unit (8) that is the support unit to output Fxb4 to the brake controller. When accompanied with additional information (flag, vdm_status flag) indicative of Fxb_vdm output from dynamics compensation functional unit (8) being valid, the arbitration function selects Fxb_vdm that is the output from dynamics compensation functional unit (8) with highest priority to calculate Fxb4. In other cases, Fxb3 that is the output from distribution functional unit (4)' may be selected to calculate Fxb4, or Fxb3 output from distribution functional unit (4)' may have Fxb_vdm reflected by a predetermined degree of reflection to calculate Fxb4. The equation at this stage is represented by, for example, Fxb4=max (Fxb3, Fxb_vdm), using a function "max" that selects the larger value.

FIG. 6 shows a control configuration of main control system (3). Main control system (3) covering control of the steering system is adapted to control by the procedure set forth below.

At steering basic driver model (1)", basic steering driver model output ($\Delta 0$) is calculated based on HMI input information such as the steering angle (sa), vehicle speed (spd) that is shared information (9), horizontal G acting on the vehicle (Gy), and the like. The equation at this stage is represented by $\Delta 0$=f (sa, spd, Gy), using function f.

At correction functional unit (2)", $\Delta 0$ is corrected to output $\Delta 1$ based on Risk_Idx [n] that is environmental information (6) from the adviser unit (for example, information transformed into the concept of risk, and the like). The equation at this stage is represented by $\Delta 1$=f ($\Delta 0$, Risk_Idx [n]), using function f.

Specifically, it is calculated by $\Delta 11$=$\Delta 0$×Risk_Idx [n]. The degree of risk is input from the adviser unit such as Risk_Idx [n]=0.8, Risk_Idx [2]=0.6, and Risk_Idx [3]=0.5.

Further, $\Delta 12$ that is a corrected version of $\Delta 0$ is calculated based on information transformed into the concept of stability and the like from the vehicle state (10). The equation at this stage is represented by $\Delta 12$=$\Delta 0$×Stable_Idx [n]. For example, Stable_Idx [1]=0.8, Stable_Idx [2]=0.6, and Stable_Idx [3]=0.5 are input.

The smaller of these $\Delta 11$ and $\Delta 12$ may be selected to be output as $\Delta 1$.

At correction functional unit (2)", assignment intention information to automatic cruise functional unit (7) that is the agent function can be output when the driver has depressed the lane keep assist switch. Furthermore, the output may be corrected in accordance with an external disturbance such as the side wind at correction functional unit (2)".

At arbitration functional unit (3)", arbitration is executed between $\Delta 1$ output from correction functional unit (2)" and $\Delta a$ output from automatic cruise functional unit (7) that is the agent unit to output $\Delta 2$ to arbitration unit (5)". When accompanied with additional information (flag, available_status flag) indicative of $\Delta a$ that is the output from automatic cruise functional unit (7) being valid, the arbitration function selects $\Delta a$ that is the output from automatic cruise functional unit (7) with the highest priority to calculate $\Delta 2$. In other cases, $\Delta 1$ that is the output from correction functional unit (2)" may be selected to calculate $\Delta 2$, or $\Delta 1$ that is the output from correction functional unit (2)" may have $\Delta a$ reflected by a predetermined degree of reflection to calculate $\Delta 2$. The equation at this stage is represented by, for example, $\Delta 2$=f ($\Delta 1$, $\Delta a$).

At arbitration functional unit (5)", arbitration is executed between $\Delta 2$ output from arbitration functional unit (3)" and $\Delta$_vdm output from dynamics compensation function unit (8) that is the supporter unit to provide $\Delta 4$ to the steering controller. When accompanied with additional information (flag, vdm_status flag) indicative of $\Delta$_vdm output from dynamics compensation functional unit (8) being valid, the arbitration function selects $\Delta$_vdm that is the output from dynamics compensation functional unit (8) with highest priority to calculate $\Delta 4$. In other cases, $\Delta 2$ may be selected that is the output from arbitration functional unit (3)" to calculate $\Delta 4$, or $\Delta 2$ that is the output from arbitration functional unit (3)" may have $\Delta$_vdm reflected by a predetermined degree of reflection to calculate $\Delta 4$. The equation at this stage is represented by, for example, $\Delta 4$=max ($\Delta 2$, $\Delta$_vdm), using a function "max" that selects the larger value.

The operation of a vehicle incorporating the integrated control system set forth above will be described hereinafter.

During driving, the driver manipulates accelerator pedal 200, brake pedal 580 and steering wheel 440 to control the driving system control unit corresponding to the "running" operation that is the basic operation of a vehicle, the brake system control unit corresponding to the "stop" operation, and the steering system control unit corresponding to a "turning" operation, based on information obtained by the driver through his/her own sensory organs (mainly through sight). Basically, the driver controls the vehicle through HIM input therefrom. There may also be the case where the driver manipulates the shift lever of the automatic transmission to modify the gear ratio of transmission 240 in an auxiliary manner.

During the drive of a vehicle, various environmental information around the vehicle is sensed by various devices incorporated in the vehicle, in addition to the information obtained by the driver through his/her own sensory organs. The information includes, by way of example, the distance from the vehicle running ahead, sensed by a millimeter wave radar, the current vehicle position and the road state ahead (corner, traffic jam, and the like) sensed by the navigation device, the road inclination state sensed by a G sensor (level road, up-climbing road, down-climbing road), the outdoor temperature of vehicle sensed by an outdoor temperature sensor, local weather information of the current running site received from a navigation device equipped with a receiver, the road resistance coefficient (low µ road state and the like by road surface freezing state), the running state of the vehicle ahead sensed by a blind corner sensor, a lane-keep state sensed based upon an image-processed picture taken by an outdoor camera, the driving state of the driver sensed based upon an image-processed picture taken by an indoor camera (driver posture, wakeful state, nod-off state), the dosing state of a driver sensed by sensing and analyzing the grip of the driver's hand by a pressure sensor provided at the steering wheel, and the like. These information are divided into environmental information around the vehicle, and information about the driver himself/herself. It is to be noted that both information are not sensed through the sensory organs of the driver.

Furthermore, the vehicle dynamic state is sensed by a sensor provided at the vehicle. The information includes, by way of example, wheel speed Vw, vehicle speed in the longitudinal direction Vx, longitudinal acceleration Gx, lateral acceleration Gy, yaw rate γ, and the like.

The present vehicle incorporates a cruise control system and a lane-keep assist system as the driving support system to support the driver's drive. These systems are under control of the agent unit. It is expected that a further development of the agent unit will lead to implementation of a complete automatic cruising operation, exceeding the pseudo automatic cruising. The integrated control system of the present embodiment is applicable to such cases. Particularly, implementation of such an automatic cruising system is allowed by just modifying the automatic cruise function of the agent unit to an automatic cruise function of a higher level without modifying the driving system control unit corresponding to main control system (1), the brake system control unit corresponding to main control system (2), the steering system control unit corresponding to main control system (3), the adviser unit, and the supporter unit.

Consider a case where there is a corner ahead in the currently-running road during driving. This corner cannot be identified by the eye sight of the driver, and the driver is not aware of such a corner. The adviser unit of the vehicle senses the presence of such a corner based on information from a navigation device.

When the driver steps on accelerator pedal 200 for acceleration in the case set forth above, the driver will depress brake pedal 580 subsequently to reduce the speed of the vehicle at the corner. At main control system (1), the basic drive driver model output Fxp0 is calculated by Fxp0=f (pa, spd, ig), based on the accelerator pedal opening angle (pa), vehicle speed (spd), gear ratio of the transmission (ig), and the like. Conventionally, a large request driving torque value will be calculated based on this FxP0 to cause opening of the throttle valve of engine 140, and/or reducing the gear ratio of transmission 240 to cause vehicle acceleration. In the present invention, the adviser unit calculates the degree of risk Risk_Idx [n] based on the presence of the corner ahead and outputs this information to correction functional unit (2). Correction functional unit (2) performs correction such that acceleration is not exhibited as the driver will expect from his/her depression on accelerator pedal 200.

When the supporter unit senses that the road surface is freezing and there is a possibility of slipping sideways by the vehicle longitudinal acceleration at this stage, Stable_Idx [n] that is the degree of risk related to stability is calculated and output to correction functional unit (2). Thus, correction functional unit (2) performs correction such that acceleration is not exhibited as the driver will expect from his/her depression on accelerator pedal 200.

When slippage of the vehicle is sensed, the supporter unit outputs to arbitration functional unit (5) a signal that will reduce the driving torque. In this case, Fxp_vdm from the supporter unit is employed with priority such that the power train is controlled to suppress further slippage of the vehicle. Therefore, even if the driver steps on accelerator pedal 200 greatly, arbitration is established such that the acceleration is not exhibited as the driver will expect from his/her depression on accelerator pedal 200.

Such a vehicle integrated control system will be described more specifically. In the following, a case where the vehicle integrated control system described above is used to cause a vehicle to move by a small distance will be described.

Figure 7:
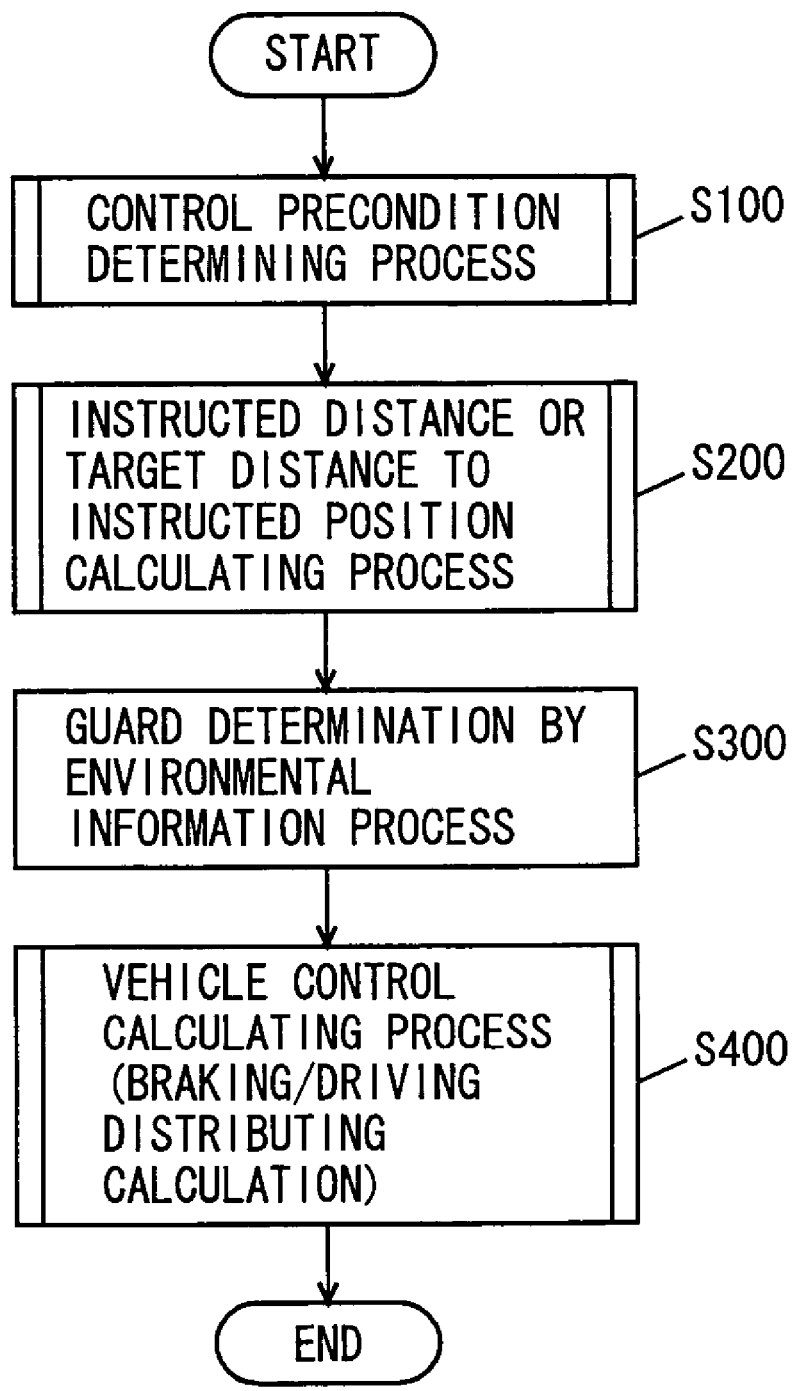
FIG. 7 is a flowchart of a main program executing a target distance movement control.

FIG. 7 is a flowchart of a main program executing a target distance movement control in an integrated control system of a vehicle. The target distance movement control can be grasped as, for example, one automatic cruise function that the agent unit has. In other words, the flowchart indicated in the following shows a control configuration of a program executed at ECU (Electronic Control Unit) implementing the agent unit, and a control configuration of a program executed at an ECU implementing main control system (1) (a driving control unit) or at an ECU implementing main control system (2) (a brake control unit). It is noted that, the ECU implementing main control system (1) (the driving control unit) is, for example, an engine ECU, while the ECU implementing main control system (2) (the brake control unit) is, for example, a brake ECU.

At step (hereinafter, step is referred to as S) 100, the agent unit ECU execute a control precondition process of this target distance movement control. Detail of the control precondition process will be described later.

At S200, the agent unit ECU executes a calculation process calculating an instructed distance or a target distance to an instructed position. Detail of the target distance calculation process will be described later.

At S300, the agent unit ECU uses environmental information indicative of the risk calculated at the adviser unit based on the condition of the surroundings of vehicle, and determines whether or not the target distance movement control should be executed. In other words, when it is determined that the risk is high based on the environmental information, a guard (regulation) based on the environmental information comes into effect, and execution of the target distance movement control will not be permitted.

In the adviser unit, information such as weather, temperature or the like at the current position of the vehicle from a navigation device with a communication function, and information from an on-board camera that is a surrounding monitoring sensor and that images the outside of the vehicle, or from a clearance sensor sensing obstacles around the vehicle, are input. From the surroundings monitoring sensor, information of sensing an obstacle in the traveling direction of the vehicle. Based on such input information, the adviser unit generates and outputs risk information to be used at the agent unit. More specifically, the adviser unit recognizes the frictional resistance (μ value) of the road based on the weather or the like at the current position of the vehicle, an obstacle in the traveling direction of the vehicle (irregular portions of the road), or the road inclination, as the environmental information of the surroundings of the vehicle. They may indicate that, for example, it is difficult to execute control for causing the vehicle to move by a short distance. In such a case, information is generated that indicates the degree of risk to the target distance movement control is high. This information indicative of high degree of risk of target distance movement control is output to the agent unit, main control system (1) (the driving control unit) or main control system (2) (the brake control unit). It is noted that this information indicative of high degree of risk of target distance movement control is processed at the adviser unit so that it can be used by any unit or main control system.

At S400, a control calculation process of the vehicle is executed so that the calculated target driving force is developed. This is mainly a braking/driving force distributing calculation process. Detail of the braking/driving force distributing calculation process will be described later.

Figure 8:
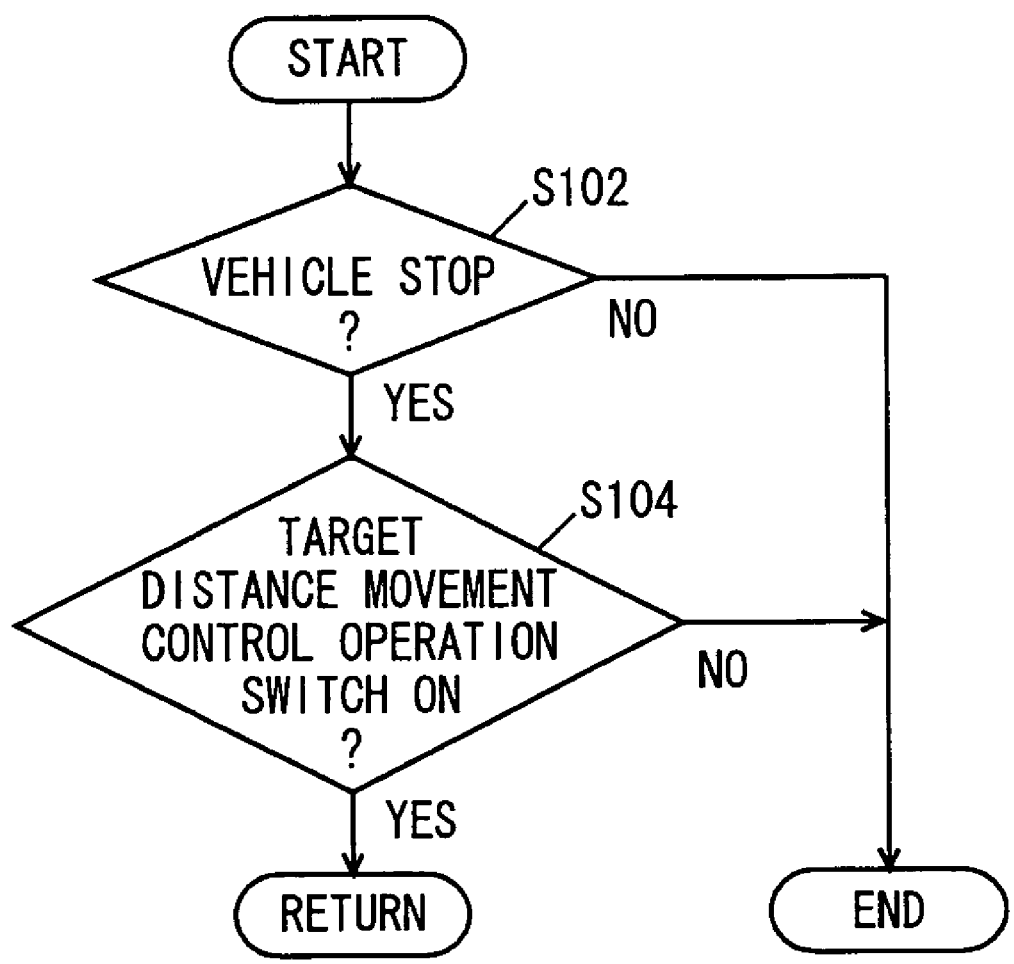
FIGS. 8–10 show flowcharts of subroutine programs of FIG. 7.

Referring to FIG. 8, the control precondition process at S100 in FIG. 7 is described.

At S102, the agent unit ECU determines whether the vehicle is stopped or not. This determination is made based on a value sensed by a wheel speed sensor, a value sensed by an output shaft rotation number sensor of transmission 240, and the like. When the vehicle is stopped (YES at S102), the process goes to S104. Otherwise (NO at S102), the target distance movement control process ends.

At S104, the agent unit ECU determines whether or not an operation switch of the target distance movement control is turned ON. This determination is made based on the fact that an operation switch of the target distance movement control provided in the vehicle interior to be manipulated by a driver is turned ON, the fact that an operation switch of the target distance movement control provided on a touch panel screen of a navigation device is turned ON, and the like. When the operation switch of the target distance movement control is turned ON (YES at S104), the process goes to S200 in FIG. 7. Otherwise (NO at S104), the target distance movement control process ends.

Figure 9:
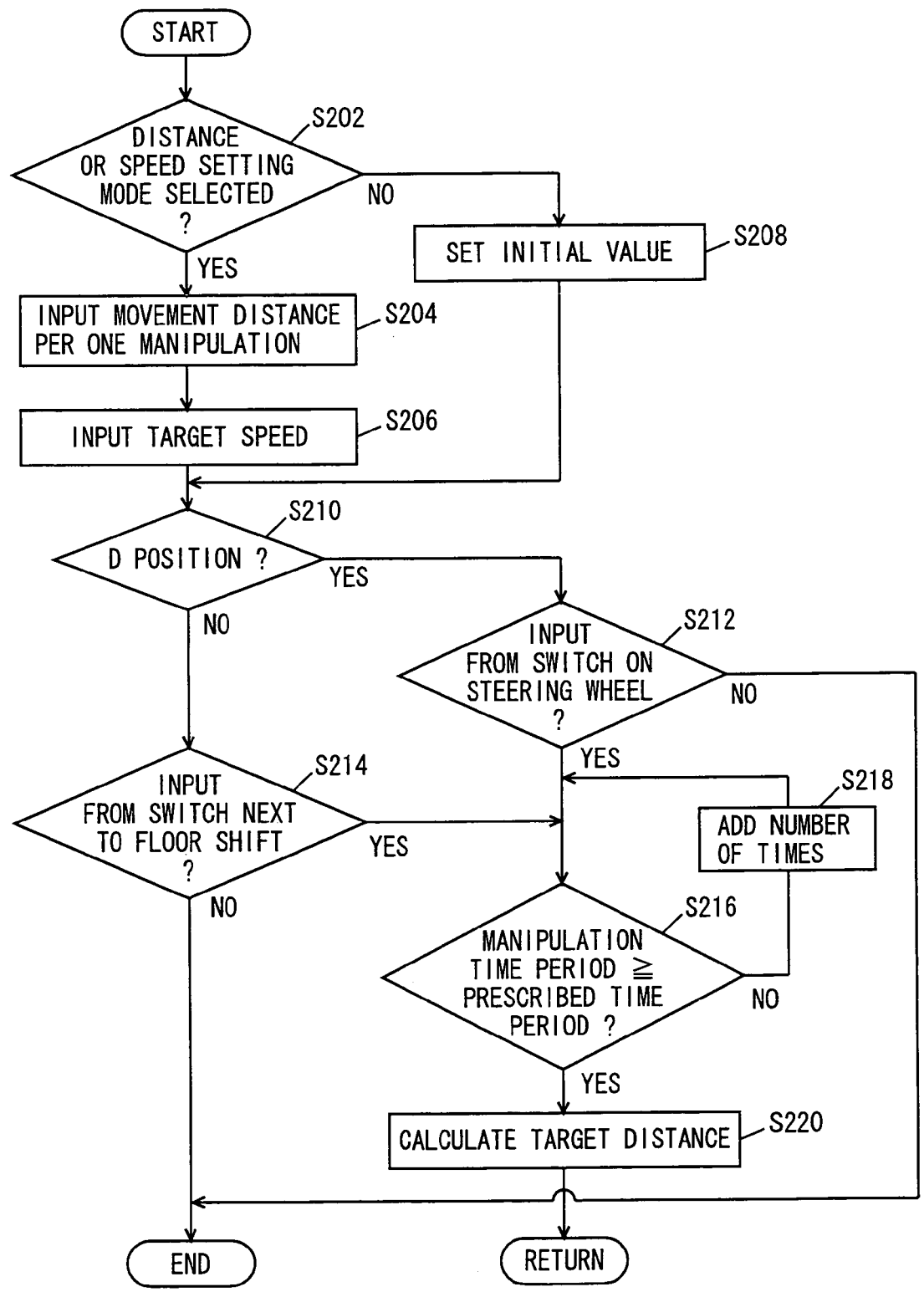

Referring to FIG. 9, the target distance calculation process at S200 in FIG. 7 is described.

At S202, the agent ECU determines whether or not a setting mode of distance or speed is selected. This determination is made based on the fact that a setting mode switch provided near the target distance movement control operation switch to be manipulated by a driver provided in the vehicle interior is turned ON, the fact that a setting mode switch provided on a touch panel screen of a navigation device is turned ON, and the like. When setting mode of distance or speed is selected (YES at S202), the process goes to S204. Otherwise (NO at S202), the process goes to S208.

At S204, the agent unit ECU senses an input of a movement distance per one manipulation, and stores the sensed value in the memory as a movement distance of a case where a movement distance setting device, which will be described later, is once manipulated by the driver. At S206, the agent unit ECU senses an input of target vehicle speed in the target distance movement control, and stores the sensed value in the memory as a target vehicle speed in the target distance movement control. Here, the upper limit value of the target vehicle speed is determined, and a vehicle speed equal to or more than the upper limit value cannot be input.

At S208, the agent unit ECU sets the movement distance per one manipulation of the movement distance setting device and the target vehicle speed in the target distance movement control stored in the memory to initial values. These initial values are stored in the memory.

At S210, the agent unit ECU determines whether or not the position of transmission 240 is D (Drive) position. This determination is made based on a position signal output from transmission 240. When the position of transmission 240 is D (Drive) position (YES at S210), the process goes to S212. Otherwise (NO at S210), the process goes to S214.

At S212, the agent unit ECU determines whether or not a manipulation signal is input via a switch (the movement distance setting device) on the steering wheel. This determination is made based on a signal input from a switch, for example, provided on the steering wheel (the "+/−" switch on the sequential shift may serve as this switch). When the manipulation signal is input via the switch (the movement distance setting device) on the steering wheel (YES at S212), the process goes to S216. Otherwise (NO at S212), the target distance movement control process ends.

At S214, the agent unit ECU determines whether a manipulation signal is input via a switch (the movement distance setting device) next to a floor shift. This determination is made based on a signal input from a switch, for example, provided on next to the floor shift (the "+/−" switch on the sequential shift may serve as this switch). When the manipulation signal is input via the switch (the movement distance setting device) next to the floor shift (YES at S214), the process goes to S216. Otherwise (NO at S214), the target distance movement control process ends.

At S216, the agent unit ECU determines whether or not a manipulation time period of the movement distance setting device (the switch on the steering wheel or the switch next to the floor shift) amounts to a prescribed time period or more than that, that has been set in advance. This determination is made by starting measurement with an addition timer when YES at S212 or YES at S214, and comparing the count value of the addition timer as the manipulation time period with the prescribed time period. When the manipulation time period amounts to a prescribed time period that has been set in advance or more than that (YES at S216), the process goes to S220. Otherwise (NO at S216), the process goes to S218.

At S218, the agent unit ECU adds the number of manipulation performed with the movement distance setting device (the switch on the steering wheel or the switch next to the floor shift). At S220, the agent unit ECU calculates a target distance. Here, by multiplying a movement distance per one manipulation and a manipulation number, a target distance in the target distance movement control is calculated. Thereafter, process goes to S300 in FIG. 7.

Figure 10:
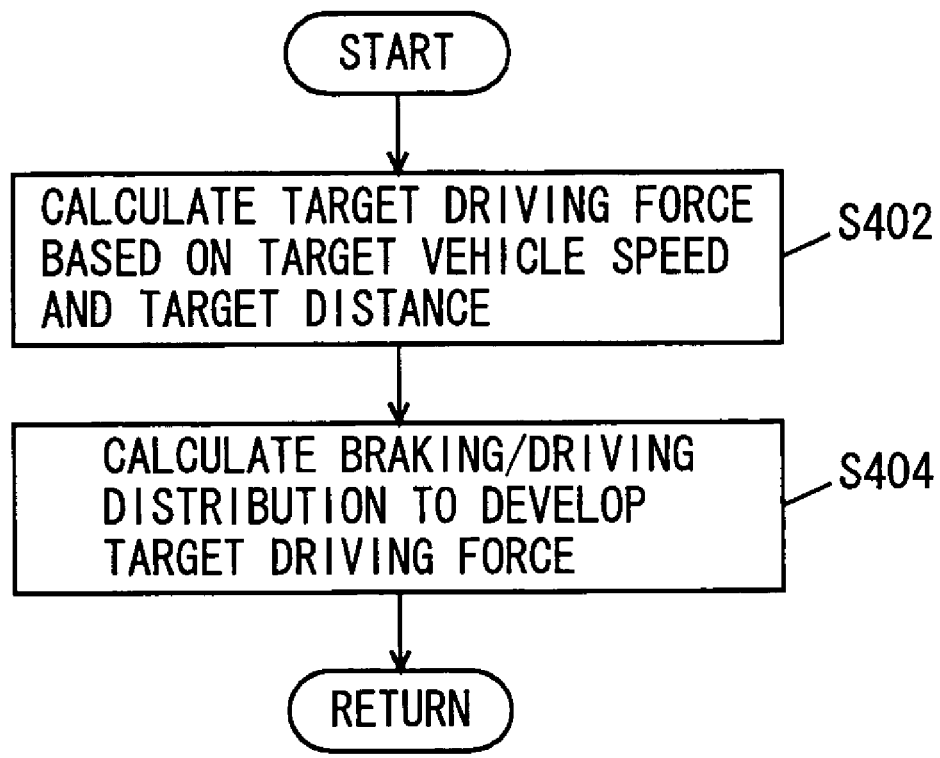

Referring to FIG. 10, the braking/driving force distributing calculation process at S400 in FIG. 7 is described.

At S402, either the main control system (1) (the accelerator) ECU or the main control system (the brake) ECU, or both of them (hereinafter both of them) calculate a target driving force based on the target vehicle speed and the target distance. Here, the target driving force is calculated not based on target longitudinal acceleration Gx* (DRV0) calculated using the drive basic driver model based on an accelerator manipulation by the driver, target longitudinal acceleration Gx* (BRK0) calculated using the brake basic driver model based on a brake manipulation by the driver and the like, but calculated based on the target vehicle speed and the target distance generated at the agent unit. When it is determined that the risk is high based on environmental information from the adviser unit at the process of S300 that is executed prior to the process of S400, a guard (regulation) based on the environmental information comes into effect and execution of the target distance movement control will not be permitted. Accordingly, the process at S400 will not be performed.

At S404, both the main control system (1) (the accelerator) ECU and the main control system (the brake) ECU execute the braking/driving force distributing calculation so that the target driving force is developed. Specifically, at the distribution function unit, on main control system (1) side, driving torque and braking torque are distributed between main control system (2) to calculate target driving torque $\tau x^*$ (DRV0) of the driving side. On main control system (2) side, driving torque and braking torque are distributed between the main control system (1) to calculate target braking torque $\tau x^*$ (BRK0) of the braking side.

Now, description is provided as to an operation of a vehicle incorporating the vehicle integrated control system of the present embodiment based on the configuration and flowcharts described above.

Assume that the vehicle enters an elevator-system parking garage, goes over a wheel stopper, and must stop immediately. It may be a case when the distance from the preceding running vehicle in traffic jam is to be shortened.

When the vehicle is stopped (YES at S102) and the driver turns the operation switch of the target distance movement control displayed on the screen of the car navigation device ON (YES at S 104) by touching the screen, a precondition of the target distance movement control is satisfied.

When the driver desires to change the setting value of the target distance movement control from the initial value, the driver turns the setting mode switch displayed on the screen of the car navigation device ON (YES at S202) by touching the screen, inputs a movement distance per one manipulation (S204), and inputs a target movement distance (S206). When the driver does not change the setting value of the target distance movement control from the initial value, the initial value is used.

The "+/−" button of the sequential shift switch on the steering wheel when at D (Drive) position (YES at S210), or the "+/−" button of the sequential shift switch next to the floor shift when not at D (Drive) position (NO at S210), adds the number of manipulation performed until a prescribed time period elapses (S218). When the prescribed time period elapses (YES at S216), the manipulation number and the movement distance per one manipulation are multiplied to calculate the target distance (S220).

As environmental information from the adviser unit, when it is sensed that the wheel stopper is too high, or an obstacle for the target distance movement control is sensed, information indicative of the high degree of risk of target distance movement control is output. Based on the information indicative of the high degree of risk of target distance movement control, this target distance movement control may not be executed.

By both the main control system (1) (accelerator) ECU and main control system (2) (brake) ECU, a target driving force is calculated based on the target vehicle speed and the target distance (S402). It is determined how to distribute this target driving force between the driving system of engine 100 and transmission 240, and the brake system of brake 620 (S404). Here, target driving torque $\tau x^*$ (DRV0) of the driving side and target braking torque $\tau x^*$ (BRK0) of the braking side are calculated. Based on the calculated target driving torque $\tau x^*$ (DRV0) and target braking torque $\tau x^*$ (BRK0), the power train, the brake device and the like are controlled. Here, target driving torque $\tau x^*$ (DRV0) of the driving side may be developed at engine 100 only, it may be developed at a motor not shown in FIG. 1, or it may developed at engine 100 and the motor. In this case, which actuator is used is determined so that higher energy efficiency is obtained.

Thus, the vehicle integrated control system of the present embodiment operates as follows: at main control system (1) identified as the driving system control unit, accelerator pedal manipulation that is a request of a driver is sensed, and a control target of the driving system corresponding to the accelerator pedal manipulation is generated using a driving basic driver model, whereby the power train that is a drive actuator is controlled. At main control system (2) identified as the brake system control unit, brake pedal manipulation that is a request of the driver is sensed, and a control target of the brake system corresponding to the brake pedal manipulation is generated using a brake basic driver model, whereby the brake device that is the braking actuator is controlled. At main control system (3) identified as the steering system control unit, steering manipulation that is a request of the driver is sensed, and a control target of the steering system corresponding to the steering manipulation is generated using a steering basic driver model, whereby the steering device that is an actuator is controlled. These control units operate autonomously.

In addition to the driving system control unit, brake system control unit, and steering system control unit operating autonomously, there are further provided an adviser unit, an agent unit, and a supporter unit. The adviser unit generates and provides to respective control units information to be used at respective control units based on environmental information around the vehicle or information related to the driver. The adviser unit processes information representing the degree of risk with respect to operation characteristics of the vehicle based on the frictional resistance of the running road, outer temperature and the like as environmental information around the vehicle, and/or information representing the degree of risk with respect to the manipulation of a driver based on the fatigue level of the driver upon shooting a picture of the driver so as to be shared among respective control units. The agent unit generates and provides to respective control units information to be used at respective control units to cause the vehicle to implement a predetermined behavior. The agent unit generates information to implement an automatic cruise functions for automatic cruising of vehicle. Information to implement the automatic cruise function is output to respective control units. The supporter unit generates and provides to respective control units information to be used at respective control unit based on the current dynamic state of the vehicle. The supporter unit identifies the current dynamic state of the vehicle to generate information required to modify the target value at respective control units.

At respective control units, arbitration processing is conducted as to whether information output from the adviser unit, agent unit and supporter unit is to be reflected in the motion control of the vehicle, and if to be reflected, the degree of reflection thereof These control unit, adviser unit, agent unit and supporter unit operate autonomously. Eventually at respective control units, the power train, brake device, and steering device are controlled based on the eventual drive target, braking target, and steering target calculated by information input from the adviser unit, agent unit and supporter unit, as well as information communicated among respective control units.

Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. With respect to these control units, the adviser unit, agent unit and supporter unit are provided, that can generate and output to respective control units information related to the risk and stability with respect to environmental information around the vehicle and information related to the driver, information to implement automatic cruise function for automatic cruising of the vehicle, and information required to modify the target value of respective control units to these control units. Therefore, a vehicle integrated control system that can readily accommodate automatic cruising control of high level can be provided.

More specifically, when a vehicle is caused to move by a small distance so as to pass over a step in a multistory parking garage, or when a vehicle is caused to move forward by a small distance at an intersection with poor visibility, the target distance movement control function that is an automatic cruise function of the agent unit integrally controls the driving system and the braking system so that the vehicle is caused to move by the target movement distance input by a manipulation of a driver, which is not an accelerator pedal manipulation or a brake pedal manipulation, and then stopped. The movement distance is calculated by, for example, multiplying the number of the "+/−" of the sequential shift being pressed within a prescribed time period and a prescribed distance per one manipulation. Accordingly, by shortening the prescribed distance per one manipulation, the vehicle is caused to move accurately by a small distance. As a result, the manipulation of the driver can be eliminated, whereby sudden acceleration when parking is prevented.

In the following, a first modification of the present embodiment is described.

Figure 11:
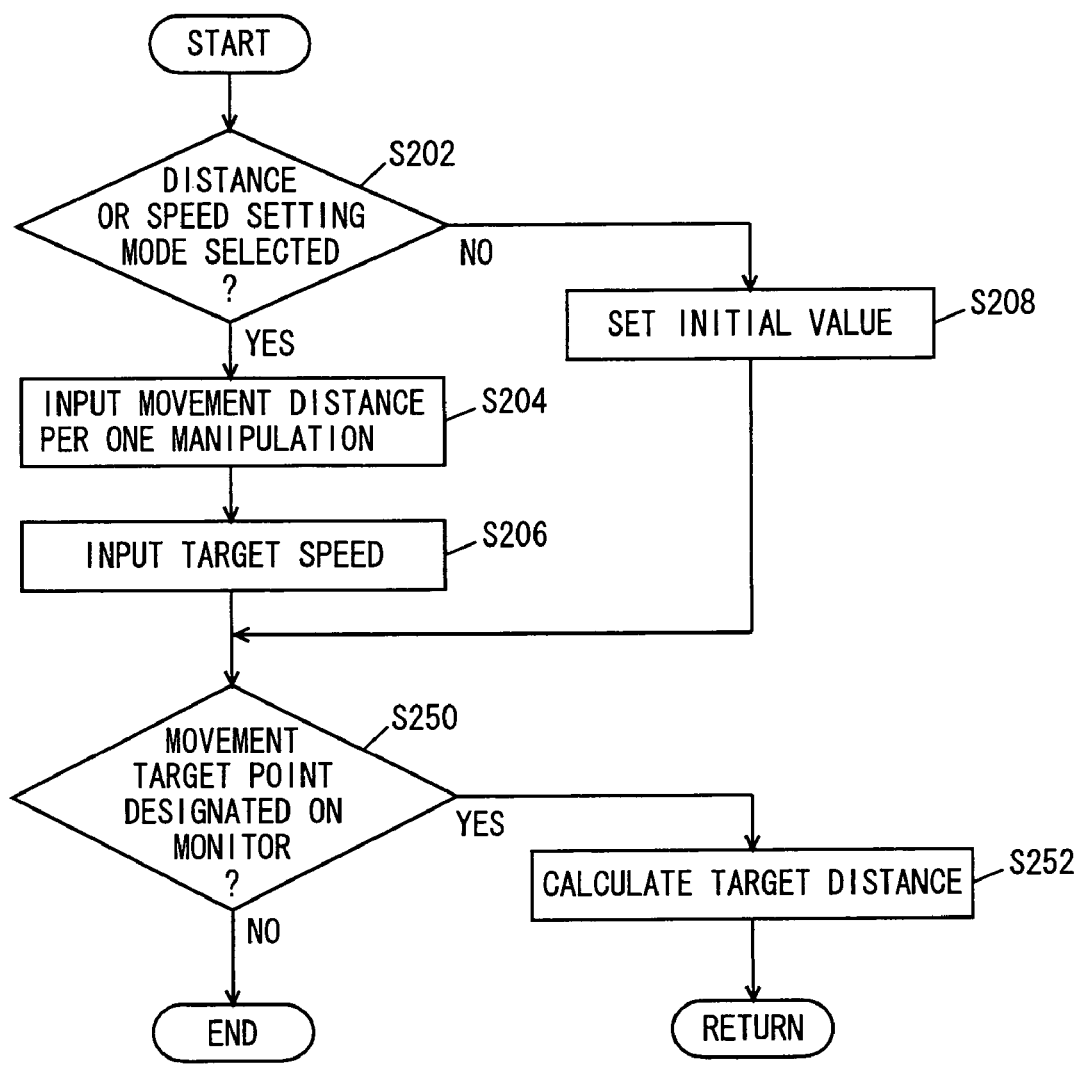
FIG. 11 shows a flowchart of a subroutine program indicating a first modification of the subroutine program shown in FIG. 9.

In the first modification, not the target movement distance, but the target movement position is set. An on-board camera picks up the image of the front and back of the vehicle and displays it on a monitor in the vehicle. By a driver touching the screen with his/her hand, the position on the screen being touched is set as a target movement position. In the following, description will be provided using the flowchart shown in FIG. 11. In the flowchart shown in FIG. 11, the same process appearing in FIG. 9 is allotted with the same step reference number. The content of the process is likewise the same. Accordingly, detailed description thereof will not be repeated.

At S250, the agent unit ECU determines whether or not a movement target point is designated on the monitor. If the movement target point is designated on the monitor (YES at S250), the process goes to S252. Otherwise (NO at S250), the target distance movement control process ends.

At S252, the agent unit ECU executes calculation calculating the target distance. Here, the distance calculated by an image processing device of the on-board camera is calculated as the target distance. In other word, it is not necessary for the driver to set a movement distance as in the embodiment described above.

As above, according to the present modification, the driver can set the movement distance of the vehicle using the image of the surroundings of the vehicle displayed on the screen. It is noted that, in place of touching the monitor to set (match) the position, other devices (for example, a jog dial) may be employed along with the image displayed on the monitor to set the movement position.

In the following, a second modification of the present embodiment is described.

Figure 12:
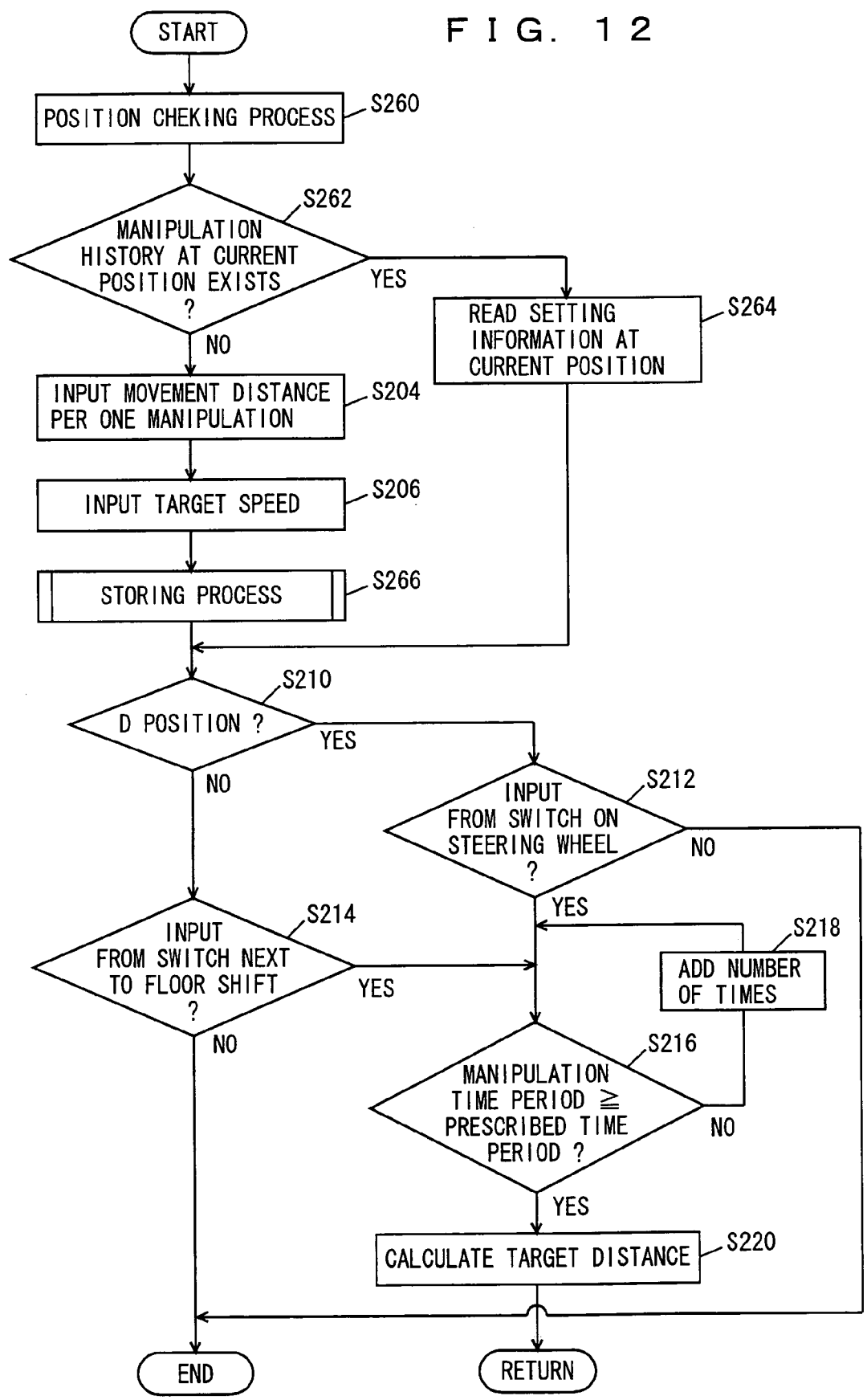
FIG. 12 shows a flowchart of a subroutine program indicating a second modification of the subroutine program shown in FIG. 9.

In the second modification, when setting of a movement distance per one manipulation or a target movement speed was executed in the past, the setting value is read from the memory so that the setting manipulation can be omitted. Here, the setting value that was set in the past at the same position is read from the memory. In the following, description is provided referring to the flowcharts shown in FIGS. 12 and 13. In the flowchart shown in FIG. 12, the same process appearing in FIG. 9 is allotted with the same step reference number. The content of the process is likewise the same. Accordingly, detailed description thereof will not be repeated.

At S260, the agent unit ECU executes a position checking process. Specifically, it checks whether or not a past manipulation history (a setting manipulation history of a movement distance per one manipulation or a target movement speed) exists, based on the current positional information of the vehicle input from the car navigation device.

At S262, the agent unit ECU determines whether or not a manipulation history at the current position exists. If it the manipulation at the current position exists, (YES at S262), then the process goes to S264. Otherwise (NO at S262), the process goes to S204.

At S264, the agent unit ECU reads setting information (a movement distance per one manipulation or a target movement speed) corresponding to the current position from the memory. The read setting information will be used at S210 and et seq. Then, the process goes to S210.

At S266, if setting manipulation of a movement distance per one manipulation or a target movement speed is executed at S204 and S206, the agent unit ECU executes storing process of that information being set.

Figure 13:
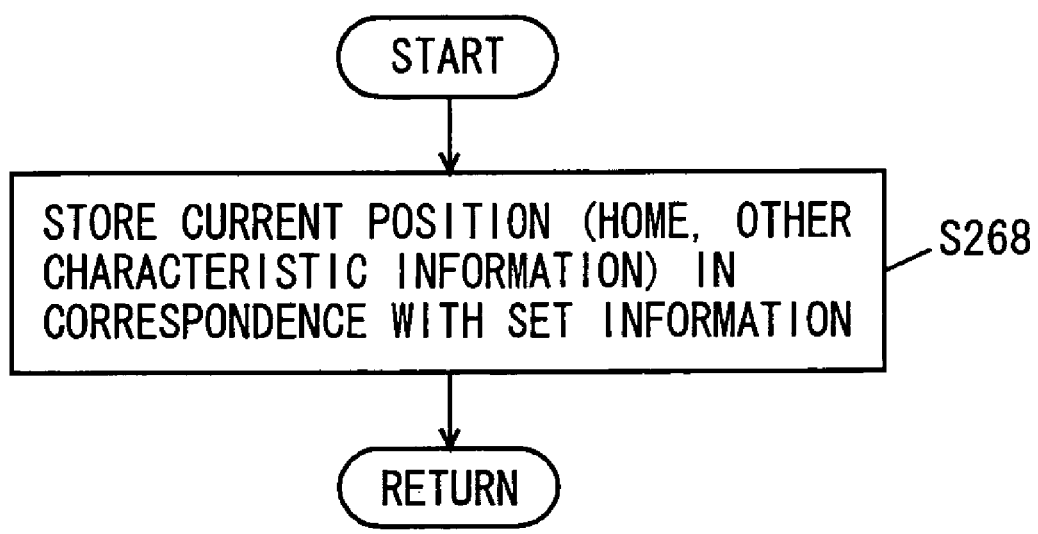
FIG. 13 shows a flowchart of the subroutine program shown in FIG. 12.

Referring to FIG. 13, the process at S266 is indicated at S268.

At S268, the agent unit ECU stores in the memory information indicative of the current position (home information or other characteristic information) and the information being set in correspondence with each other.

As above, according to the present modification, if a driver has performed setting manipulation of a movement distance per one manipulation or a target movement speed in the past at that position, from the second time, setting manipulation is not performed but the movement distance per one manipulation or the target movement speed stored in the memory is read, and target distance movement control is executed with the setting value. Thus, the driver is no longer required to repeatedly perform the same setting manipulation.

In the case where the flag from the adviser unit, agent unit and supporter unit is reset with the manipulation of the driver given highest priority, preferably control using a signal from this driving support unit will not be conducted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle integrated control system, comprising:
   a plurality of control units including at least a driving system control unit and a brake system control unit, each having a function of controlling a running state of a vehicle based on a manipulation request;
   a processing unit generating information to be used at each said control unit when causing said vehicle to move by a distance or to a position being set based on visual information of a driver, and outputting the generated information to each said control unit; and
   a sensing portion sensing an operation request to move said distance or to said position with respect to at least one control unit, wherein
   each said control unit includes
   a calculation unit calculating a control target to manipulate a corresponding actuator using at least one of said information generated by said processing unit and said sensed operation request, wherein
   said driving system control unit and said brake system control unit cooperatively distribute a driving force control target, for attaining a target driving force of said vehicle, to a driving force and a braking force.

2. The vehicle integrated control system according to claim 1, wherein
   said processing unit includes
   a movement distance setting portion setting a movement distance of said vehicle,
   a generating portion generating information to be used at each said control unit when causing said vehicle to move by a distance being set by the driver, and
   an output portion outputting said generated information to each said control unit.

3. The vehicle integrated control system according to claim 2, wherein
   said movement distance setting portion stores in advance a movement distance per one manipulation of a manipulation device, and counts a number of manipulations of said manipulation device performed in a predetermined time period to set a movement distance of said vehicle.

4. The vehicle integrated control system according to claim 3, wherein
said processing unit further includes
a storing portion storing information that has been set and that is related to the movement distance per one manipulation of a manipulation device or a movement speed, in correspondence with positional information on said vehicle relative to which said information is set, and
a setting portion setting said information related to the movement distance per one manipulation of a manipulation device or a movement speed, based on said positional information on said vehicle and stored information, and using said stored information.

5. The vehicle integrated control system according to claim 1, wherein
said processing unit includes
a movement target position setting portion setting a movement target position of said vehicle,
a movement speed setting portion setting a movement speed of said vehicle,
a generating portion generating information to be used at each said control unit when causing said vehicle to move to a position set by the driver, and
an output portion outputting said generated information to each said control unit.

6. The vehicle integrated control system according to claim 5, wherein
said movement target position setting portion sets a target movement position relative to image information obtained from a camera imaging surroundings of said vehicle.

7. The vehicle integrated control system according to claim 1, wherein
said processing unit acquires environmental information on surroundings of said vehicle, calculates a difficulty level for causing said vehicle to move by the distance set by the driver or to the position set by the driver, and determines whether or not control by each said control unit should be executed.

8. The vehicle integrated control system according to claim 1, wherein
said driving system actuator includes an engine and a motor, and
said driving system control unit controls said driving system actuator so that an energy efficiency is improved when causing said vehicle to move by the distance set by the driver or to the position set by the driver, based on information from said processing unit.

9. A vehicle integrated control system, comprising:
a plurality of control units including at least a driving system control unit and a brake system control unit, each having a function of controlling a running state of a vehicle based on a manipulation request;
a processing unit generating information to be used at each said control unit when causing said vehicle to move by a distance or to a position being set based on visual information of a driver, and outputting the generated information to each said control unit; and
sensing means for sensing an operation request to move said distance or to said position with respect to at least one control unit, wherein
each said control unit includes
calculation means for calculating a control target to manipulate a corresponding actuator using at least one of said information generated by said processing unit and said sensed operation request, wherein
said driving system control unit and said brake system control unit cooperatively distribute a driving force control target, for attaining a target driving force of said vehicle, to a driving force and a braking force.

10. The vehicle integrated control system according to claim 9, wherein
said processing unit includes
movement distance setting means for setting a movement distance of said vehicle,
generating means for generating information to be used at each said control unit when causing said vehicle to move by a distance being set by the driver, and
output means for outputting said generated information to each said control unit.

11. The vehicle integrated control system according to claim 10, wherein
said movement distance setting means includes means for storing in advance a movement distance per one manipulation of a manipulation device, and counting a number of manipulations of said manipulation device performed in a predetermined time period to set a movement distance of said vehicle.

12. The vehicle integrated control system according to claim 11, wherein
said processing unit further includes
storing means for storing information that has been set and that is related to the movement distance per one manipulation of a manipulation device or a movement speed, in correspondence with positional information on said vehicle relative to which said information is set, and
setting means for setting said information related to the movement distance per one manipulation of a manipulation device or a movement speed, based on said positional information on said vehicle and stored information, and using said stored information.

13. The vehicle integrated control system according to claim 9, wherein
said processing unit includes
movement target position setting means for setting a movement target position of said vehicle,
movement speed setting means for setting a movement speed of said vehicle,
generating means for generating information to be used at each said control unit when causing said vehicle to move to a position set by the driver, and
output means for outputting said generated information to each said control unit.

14. The vehicle integrated control system according to claim 13, wherein
said movement target position setting means includes means for setting a target movement position relative to image information obtained from a camera imaging surroundings of said vehicle.

15. The vehicle integrated control system according to claim 9, wherein
said processing unit further includes
means for acquiring environmental information on surroundings of said vehicle, and means for calculating a difficulty level for causing said vehicle to move by the distance set by the driver or to the position set by the driver, and determining whether or not control by each said control unit should be executed.

16. The vehicle integrated control system according to claim 9, wherein said driving system actuator includes an engine and a motor, and said driving system control unit further includes means for controlling said driving system actuator so that an energy efficiency is improved when causing said vehicle to move by the distance set by the driver or to the position set by the driver, based on information from said processing unit.

* * * * *